United States Patent
Fouad et al.

(10) Patent No.: US 9,288,679 B2
(45) Date of Patent: Mar. 15, 2016

(54) SYSTEM AND METHOD FOR GREEDY-BASED AUTONOMOUS RESOURCE BLOCK ASSIGNMENT SCHEME FOR CELLULAR NETWORKS WITH SELF-ORGANIZING RELAYING TERMINALS

(71) Applicant: Futurewei Technologies, Inc., Plano, TX (US)

(72) Inventors: Yaser Fouad, Ottawa (CA); Ramy Gohary, Ottawa (CA); Halim Yanikomeroglu, Ottawa (CA); Gamini Senarath, Ottawa (CA)

(73) Assignee: Futurewei Technologies, Inc., Plano, TX (US)

( * ) Notice: Subject to any disclaimer, the term of this patent is extended or adjusted under 35 U.S.C. 154(b) by 0 days.

(21) Appl. No.: 14/340,322

(22) Filed: Jul. 24, 2014

(65) Prior Publication Data

US 2015/0031406 A1    Jan. 29, 2015

Related U.S. Application Data

(60) Provisional application No. 61/858,480, filed on Jul. 25, 2013.

(51) Int. Cl.

| H04B 7/15 | (2006.01) |
|---|---|
| H04W 16/10 | (2009.01) |
| H04W 88/02 | (2009.01) |
| H04W 84/04 | (2009.01) |

(52) U.S. Cl.
CPC ............ *H04W 16/10* (2013.01); *H04W 84/047* (2013.01); *H04W 88/02* (2013.01)

(58) Field of Classification Search
None
See application file for complete search history.

(56) References Cited

U.S. PATENT DOCUMENTS

| 8,036,166 B2 | 10/2011 | Tiirola et al. |
| 8,982,769 B2 * | 3/2015 | Lv et al. ................... 370/315 |
| 2010/0135222 A1 | 6/2010 | Arnott |

(Continued)

FOREIGN PATENT DOCUMENTS

| CN | 102484871 A | 5/2012 |
| WO | 2012173530 A1 | 12/2012 |

OTHER PUBLICATIONS

Fouad, Y.M.M., et al., "An Autonomous Resource Block Assignment Scheme for OFDMA-Based Relay-Assisted Cellular Networks," IEEE Transactions on Wireless Communications, vol. 11, Feb. 2012, pp. 637-647.

(Continued)

*Primary Examiner* — Dominic E Rego
(74) *Attorney, Agent, or Firm* — Slater & Matsil, L.L.P.

(57) ABSTRACT

Iterative sequential selection techniques can be used to efficiently compute RB assignment sequences in relay-assisted networks. Embodiment techniques construct a graphical representation of a cyclic group based on a selected pattern in a set of patterns and a selected cyclic-shift in a plurality of cyclic shifts. Remaining patterns are placed in a unitary group, and an iterative sequential selection technique is used to evaluate the remaining patterns in the unitary group for each of the cyclic shifts over a sequence of iterations, thereby complete the list of RB assignment sequences. At the end of each iteration, a new RB assignment sequence is added based on the pattern, cyclic shift tuple producing the fewest collisions with occupied resource blocks of the graphical representation.

22 Claims, 13 Drawing Sheets

(56) References Cited

U.S. PATENT DOCUMENTS

| | | | |
|---|---|---|---|
| 2010/0290426 A1* | 11/2010 | Guey et al. .................... | 370/330 |
| 2011/0022812 A1 | 1/2011 | Van Der Linden et al. | |
| 2011/0069637 A1 | 3/2011 | Liu et al. | |
| 2011/0222489 A1* | 9/2011 | Awad ............................ | 370/329 |
| 2011/0261858 A1* | 10/2011 | Baldemair et al. ............ | 375/130 |
| 2011/0286440 A1* | 11/2011 | Chung et al. .................. | 370/342 |
| 2012/0163318 A1* | 6/2012 | Kishiyama et al. ........... | 370/329 |
| 2012/0170444 A1* | 7/2012 | Ogawa et al. ................. | 370/209 |
| 2013/0163505 A1* | 6/2013 | Lysejko et al. ................ | 370/315 |

OTHER PUBLICATIONS

Hasan, M., et al., "Random Access for Machine-to-Machine Communication in LTE-Advanced Networks: Issues and Approaches," IEEE Communications Magazine, vol. 51, Issue: 6, Jun. 2013, pp. 86-93.

Kostic, Z., et al., "Performance and Implementation of Dynamic Frequency Hopping in Limited-Bandwidth Cellular Systems," IEEE Transactions on Wireless Communications, vol. 1, No. 1, Jan. 2002, pp. 28-36.

Koutsimanis, C., et al., "A Dynamic Resource Allocation Scheme for Guaranteed Bit Rate Services in OFDMA Networks," IEEE International Conference on Communications, (Beijing), May 19-23, 2008, pp. 2524-2530.

NG, T.C-Y., et al., "Joint Optimization of Relay Strategies and Resource Allocations in Cooperative Cellular Networks," IEEE Journal on Selected Areas in Communications, vol. 25, No. 2, Feb. 2007, pp. 328-339.

Popovski, P., et al., "Frequency Rolling: A Cooperative Frequency Hopping for Mutually Interfering WPANs," Proceedings of the 5th ACM International Symposium on Mobile ad hoc Networking and Computing, (Tokyo), May 24-26, 2004, pp. 199-209.

Rhee, W., et al., "Increase in Capacity of Multiuser OFDM System Using Dynamic Subchannel Allocation," 2000 IEEE 51st Vehicular Technology Conference Proceedings, (Tokyo), vol. 2, May 15-18, 2000, pp. 1085-1089.

Stolyar, A. L., et al., "Self-Organizing Dynamic Fractional Frequency Reuse in OFDMA Systems," IEEE INFOCOM 2008: The 27th Conference on Computer Communications, (Phoenix), Apr. 13-18, 2008, pp. 1364-1372.

Wang, S-H., et al., "Random Access Design for Clustered Wireless Machine to Machine Networks," 2013 IEEE First International Black Sea Conference on Communications and Networking (BlackSeaCom), Jul. 3-5, 2013, pp. 107-111.

Wang, T., et al., "Smart Regenerative Relays for Link-Adaptive Cooperative Communications," IEEE Transactions on Communications, vol. 56, No. 11, Nov. 2008, pp. 1950-1960.

Wu, G., et al., "M2M: From Mobile to Embedded Internet," IEEE Communications Magazine, vol. 49, Issue: 4, Apr. 2011, pp. 36-43.

International Search Report received in Application No. PCT/US2014/048069, mailed Nov. 18, 2014, 8 pages.

* cited by examiner

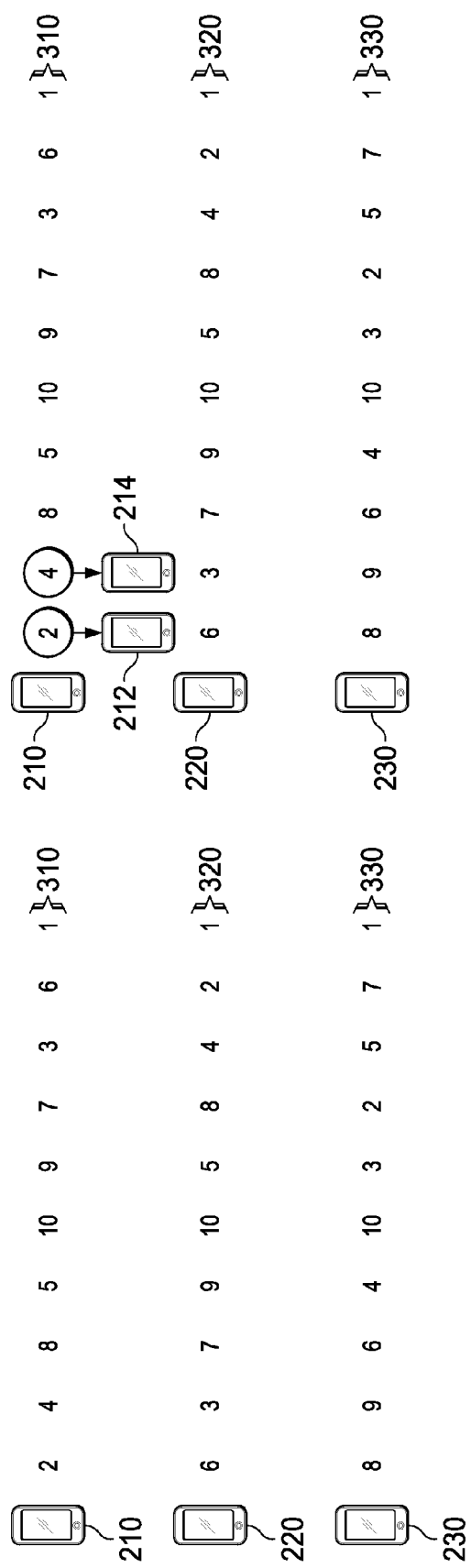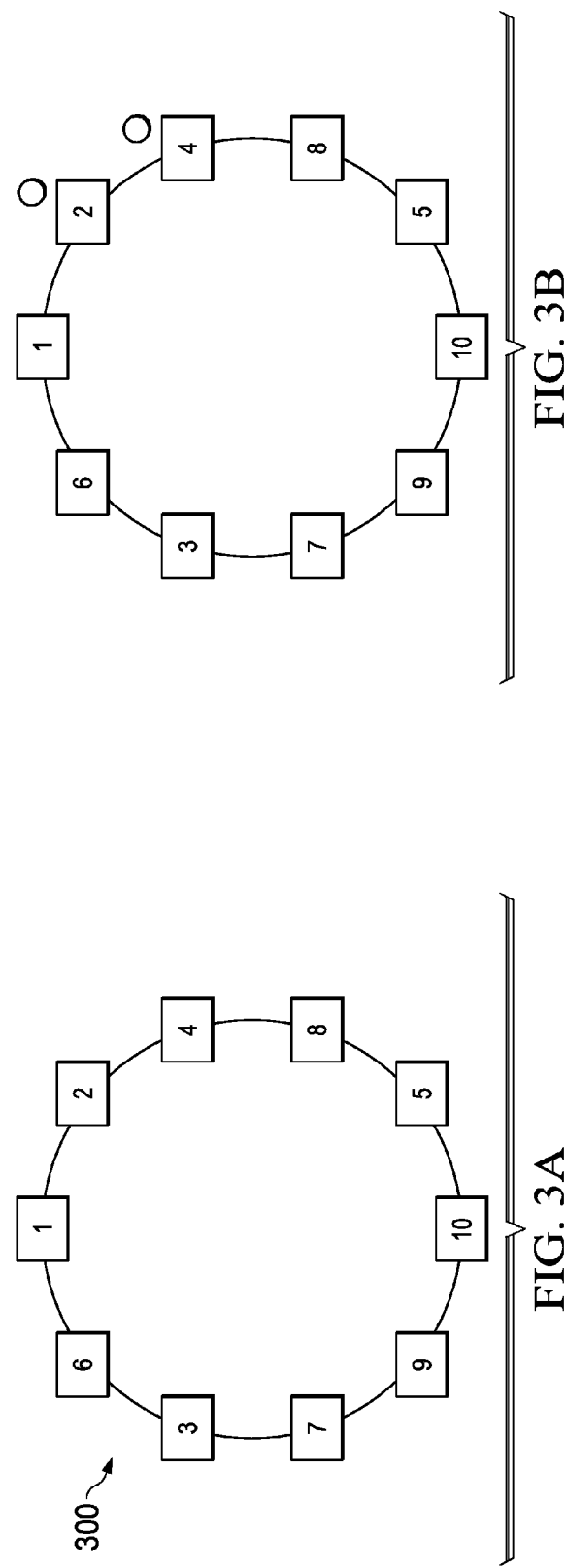

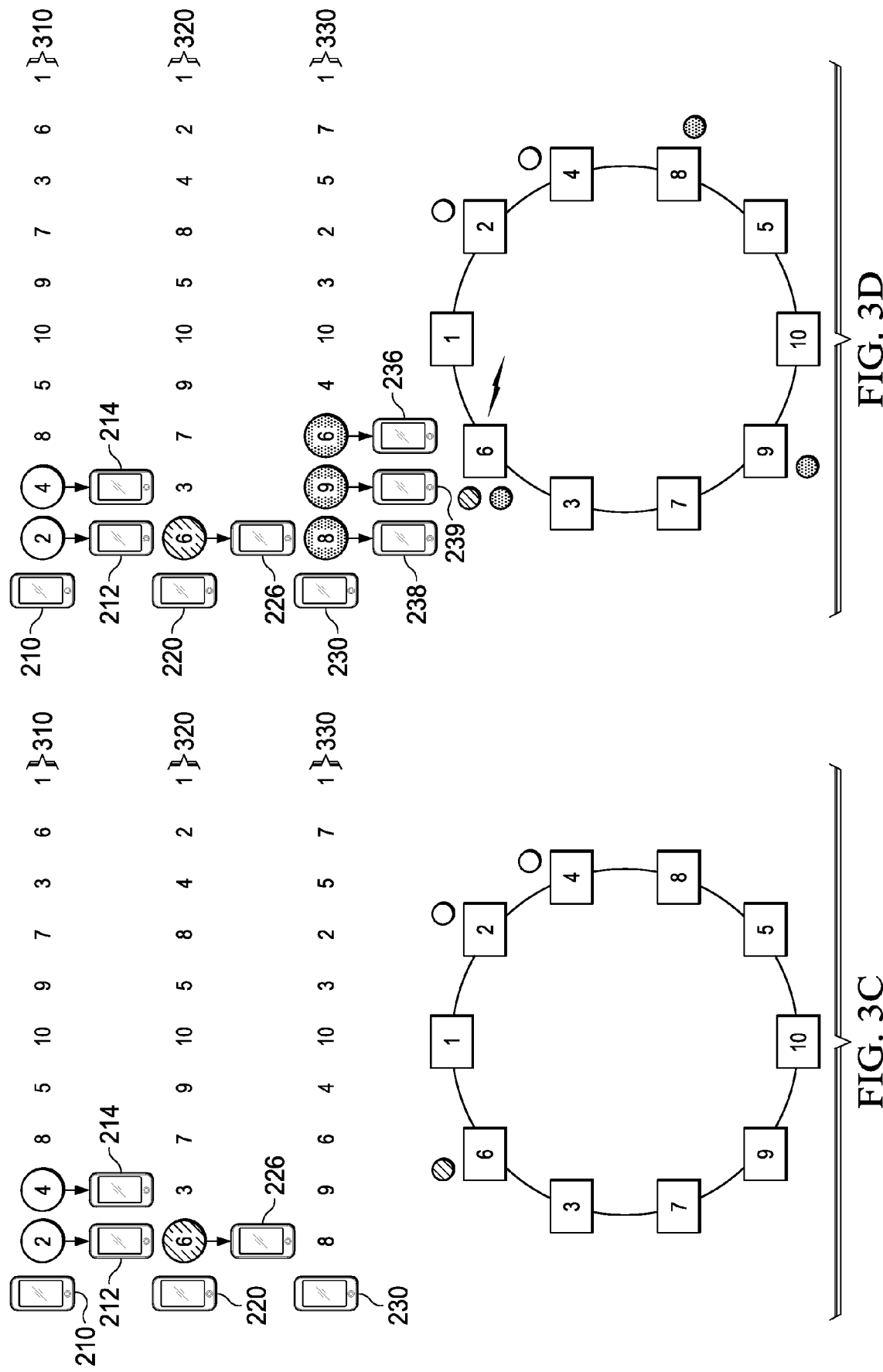

ALGORITHM 1: PSEUDO CODE OF THE GRAPHICAL GREEDY ALGORITHM

INPUT: $U, S, A_i, N$

OUTPUT: $S$

1 MOVE ONE GROUP GENERATOR PAIR WITH A CYCLIC SHIFT $s = 0$ TO THE SET OF ALGORITHM BASES, S.
2 FOR EACH ITERATION DO
3     FOR ALL GROUP GENERATOR PAIRS IN $U$ DO
4         FOR ALL $s \in \{1, ..., N\}$ DO
5             GENERATE THE CYCLIC ASSIGNMENT SEQUENCE BY UTILIZING THE CURRENT CYCLIC SHIFT AND ONE OF THE GROUP GENERATORS IN THE SELECTED PAIR.
6             EVALUATE THE NUMBER OF COLLISIONS BETWEEN THE FIRST PREDETERMINED NUMBER OF ELEMENTS IN THE GENERATED SEQUENCE AND THE ONES GENERATED BY THE GROUP GENERATORS AND CYCLIC SHIFTS STORED IN S.
7         END
8         ASSOCIATE THE MINIMUM NUMBER OF COLLISIONS AND ITS CORRESPONDING CYCLIC SHIFT WITH THE GROUP GENERATOR PAIR.
9     END
10     MOVE THE PAIR RESULTING IN THE MINIMUM NUMBER OF HITS TO THE SET OF ALGORITHM BASES, S.
11 END
12 RETURN S

FIG. 11

SYSTEM AND METHOD FOR GREEDY-BASED AUTONOMOUS RESOURCE BLOCK ASSIGNMENT SCHEME FOR CELLULAR NETWORKS WITH SELF-ORGANIZING RELAYING TERMINALS This patent application claims priority to U.S. Provisional Application No. 61/858,480, filed on Jul. 25, 2013 and entitled "System and Method for Greedy-Based Autonomous Resource Block Assignment Scheme for Cellular Networks with Self-Organizing Relaying Terminals," which is hereby incorporated by reference herein as if reproduced in its entirety.

TECHNICAL FIELD

The present invention relates to a system and method for wireless communications, and, in particular embodiments, to systems and methods for greedy-based autonomous resource block assignment schemes for cellular networks with self-organizing relaying terminals.

BACKGROUND

Relay-assisted networks improve cell performance by breaking high-attenuation radio interfaces into multiple lower-attenuation radio interfaces, as well as by extending the coverage range of base stations. Next-generation wireless networks will likely further leverage these benefits by implementing higher densities of relay terminals, as well as by accommodating both infrastructure nodes and non-infrastructure nodes, e.g., mobile devices acting as relay terminals for other mobile devices through device-to-device (D2D) or machine-to-machine (M2M) communications.

Conventional relay-assisted networks typically utilize centralized resource distribution schemes, in which the base station assigns resources for communications between the relay terminal and mobile device. These centralized resource distribution schemes may be inefficient in networks having relatively large numbers of relays due to the overhead and latencies associated with communicating allocation information between the base station and relay terminals. Accordingly, it may be advantageous to autonomously provision resources in a distributed manner at the relay terminals in order to reduce overhead and latency over the relay links.

SUMMARY OF THE INVENTION

Technical advantages are generally achieved, by embodiments of this disclosure which describe systems and methods for greedy-based autonomous resource block assignment schemes for cellular networks with self-organizing relaying terminals.

In accordance with an embodiment, a method for efficiently generating resource block (RB) assignment sequences for relays is provided. In this example, the method includes obtaining a plurality of patterns for assigning available RBs of a cell, and selecting both a first pattern from the plurality of patterns and a cyclic shift from a plurality of cyclic shifts to obtain a first pattern, cyclic-shift tuple. The remaining patterns in the plurality of patterns are included in a unitary group. The method further includes constructing a cyclic group in accordance with the first pattern, cyclic-shift tuple. The cyclic group is constrained by occupied RBs corresponding to effective RBs of the first pattern, cyclic-shift tuple. The method further includes performing iterative sequential selection of remaining patterns in the unitary group over the plurality of cyclic shifts to obtain an ordering of RB assignment sequences. The first pattern, cyclic-shift tuple specifies a first RB assignment sequence in the ordering of RB assignment sequences. The method further includes configuring lookup tables in each of the relay terminals in accordance with the ordering of RB assignment sequences. An apparatus for performing this method is also provided.

In accordance with another embodiment, a method for operating a relay is provided. In this example, the method includes receiving a set of lookup tables specifying lists of resource block (RB) assignment sequences for distributed allocation of available resource blocks in a cell. Each lookup table in the set of lookup tables is designed to assign a different number of available RBs. The method further includes determining that a first number of available RBs is allocated for assignment during a first period, identifying, from the set of lookup tables, a first lookup table adapted to assign the first number of available RBs, and autonomously assigning RBs to mobile terminals during the first period in accordance with an ordering of RB assignment sequences specified by the first lookup table. An apparatus for performing this method is also provided.

BRIEF DESCRIPTION OF THE DRAWINGS

For a more complete understanding of the present invention, and the advantages thereof, reference is now made to the following descriptions taken in conjunction with the accompanying drawing, in which:

FIGS. 3A-3D illustrate diagrams demonstrating how relay terminals allocate resources using resource block assignment sequences;

FIG. 11 illustrates a diagram of embodiment pseudo code for a graphical greedy algorithm;

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

Figure 1:
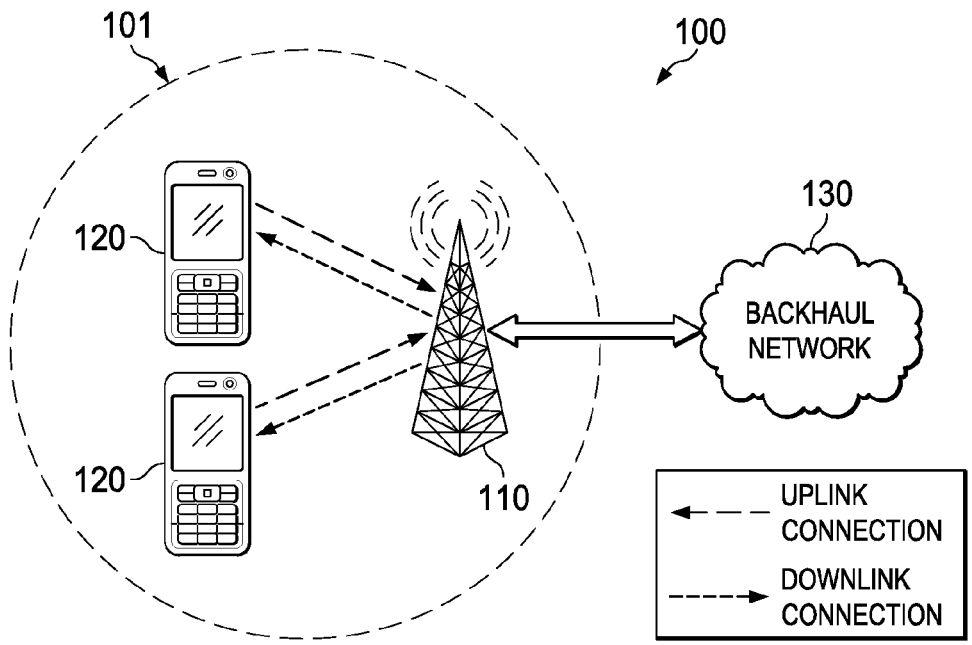
FIG. 1 illustrates a diagram of an embodiment wireless communications network.

The making and using of the embodiments are discussed in detail below. It should be appreciated, however, that the claimed invention provides many applicable inventive concepts that can be embodied in a wide variety of specific contexts. The specific embodiments discussed are merely illustrative of specific ways to make and use the invention, and do not limit the scope of the invention.

Relay terminals may use either a random allocation scheme or structured allocation scheme to achieve distributed resource provisioning. Random allocation schemes are typically less complex than structured allocation schemes, while structured allocation schemes typically provide better interference performance in dense network environments. One type of structured allocation scheme uses resource block (RB) assignment sequences to manage distributed resource assignments at the relay terminals. More specifically, a list of RB assignment sequences are stored in lookup tables at the relay terminals, which access the RB assignment sequences sequentially when assigning RBs to the mobile terminals. The following is a simple example explaining how a list of RB assignment sequences can be used to assign resources in a network having four available RBs (RB-1, RB-2, RB-3, and RB-4).

In this example, a list of RB assignment sequences is stored at each relay terminal, and includes the following ordering of RB assignments sequences: {AS(i)=<RB-1; RB-2; RB-3; RB-4>; AS(ii)=<RB-4; RB-3; RB-2; RB-1>; AS(iii)=<RB-2; RB-3; RB-4; RB-1>; and AS(iv)=<RB-4; RB-1; RB-2; RB-3>}. Initially, a first mobile terminal requests two RBs from a first relay terminal, thereby prompting the relay terminal to assign RB-1 and RB-2 to the first mobile terminal in accordance with the first assignment sequence (i.e., AS(i)=<RB-1; RB-2; RB-3; RB-4>)) in the list of RB assignments sequences. Thereafter, a second mobile station requests one RB from a second relay terminal. The second relay terminal determines that the first RB assignment sequence is in use, and selects the next available RB assignment sequence (i.e., AS(ii)). The second relay terminal then assigns the RB-4 to the second mobile station in accordance with the sequence specified by AS(ii), i.e., <RB-4; RB-3; RB-2; RB-1>.

Thereafter, a third mobile station requests a single RB from a third relay terminal, at which point the third relay terminal selects the next available RB assignment sequence (i.e., AS(iii)), and assigns RB-2 to the third mobile station in accordance with the sequence specified by the AS(iii), i.e., <RB-2; RB-3; RB-4; RB-1>. Since RB-2 is occupied by the first mobile station per the assignment by the first relay terminal, a collision occurs between the respective transmissions of the third mobile station and the first mobile. The third wireless terminal senses this interference, and re-assigns the third mobile terminal to RB-3, which is the next RB specified by the AS(iii). Consequently, all four RBs are assigned with only one collision.

Different RB assignment sequence lists offer different levels of performance. Indeed, an optimal RB assignment sequence can be computed for a given set of parameters using an exhaustive search. However, the set of parameters may change when, for example, the number of available RBs is increased/decreased, which may necessitate computation of an updated RB assignment sequence set. Notably, the relatively high computational complexity associated with exhaustive search techniques may render them ill-suited for large and/or rapidly changing networks. As such, an efficient, yet effective, scheme for computing lists of RB assignment sequences is desired.

Aspects of this disclosure provide iterative sequential selection techniques for computing RB assignment sequences in relay-assisted networks. Embodiment techniques first obtain a unitary group including patterns for assigning resource blocks. Next, a graphical representation of a cyclic group is constructed based on a selected pattern, cyclic-shift tuple, after which the corresponding pattern is removed from the unitary group. Thereafter, the remaining RB assignment sequences for the list are selected using iterative sequential selection techniques. Iterative sequential selection techniques may evaluate remaining patterns in the unitary group over a plurality of cyclic shifts during each of a sequence of iterations. At the end of each iteration, a new RB assignment sequence is added to the list. The new RB assignment sequence is defined by the pattern, cyclic shift tuple producing the fewest collisions with occupied resource blocks of the graphical representation during that iteration. More specifically, remaining patterns are sequentially evaluated (during a given iteration) for all cyclic shifts until either (i) a pattern, cyclic-shift tuple producing zero collisions is identified, or (ii) all remaining patterns have been evaluated over all cyclic shifts. In the later scenario, the pattern, cyclic-shift tuple producing the fewest collisions is used to define the new RB assignment sequence. The corresponding pattern is then removed from the unitary group in preparation for the next iteration.

Additional aspects of this disclosure allow relay terminals to store sets of RB assignment sequences for different number of available RBs, thereby allowing the relay terminals to adapt to changes in the number of available RBs without having to update their lookup tables. More specifically, different lists of RB assignment sequences may be used for different numbers of available resource blocks, with sequences in different lists not being subsets of one another. For example, the sequences for "X" available resource blocks may be substantially different than the sequences for "X+1" available resource blocks such that the later set of sequences need to be computed separately, and cannot be derived from the earlier set of sequences. It may be inefficient to update lookup tables in the relay terminals each time available resource blocks are re-allocated. To avoid this, multiple lookup tables may be stored in the relay terminals, with each lookup table specifying a list of sequences for a different number of available RBs. The relay terminal may determine how many RBs are available for a certain period through, for example, broadcast signaling, and then select the corresponding lookup table for dynamic resource assignment during that period. The relay terminal may dynamically re-select a different lookup table in response to changes in the number of available RBs, e.g., when RBs are re-allocated to/from another band. These and other aspects are described in greater detail below.

FIG. 1 illustrates a network 100 for communicating data. The network 100 comprises a base station 110 having a coverage area 101, a plurality of mobile devices 120, and a backhaul network 130. As shown, the base station 110 establishes uplink (dashed line) and/or downlink (dotted line) connections with the mobile devices 120, which serve to carry data from the mobile devices 120 to the base station 110 and vice-versa. Data carried over the uplink/downlink connections may include data communicated between the mobile devices 120, as well as data communicated to/from a remote-end (not shown) by way of the backhaul network 130. As used herein, the term "base station" refers to any component (or collection of components) configured to provide wireless access to a network, such as an enhanced base station (eNB), a macro-cell, a femtocell, a Wi-Fi access point (AP), or other wirelessly enabled devices. Base stations may provide wireless access in accordance with one or more wireless communication protocols, e.g., long term evolution (LTE), LTE advanced (LTE-A), High Speed Packet Access (HSPA), Wi- Fi 802.11a/b/g/n/ac, etc. As used herein, the term "mobile device" refers to any component (or collection of components) capable of establishing a wireless connection with a base station, such as a user equipment (UE), a mobile station (STA), and other wirelessly enabled devices. In some embodiments, the network 100 may comprise various other wireless devices, such as relays, low power nodes, etc.

Figure 2:
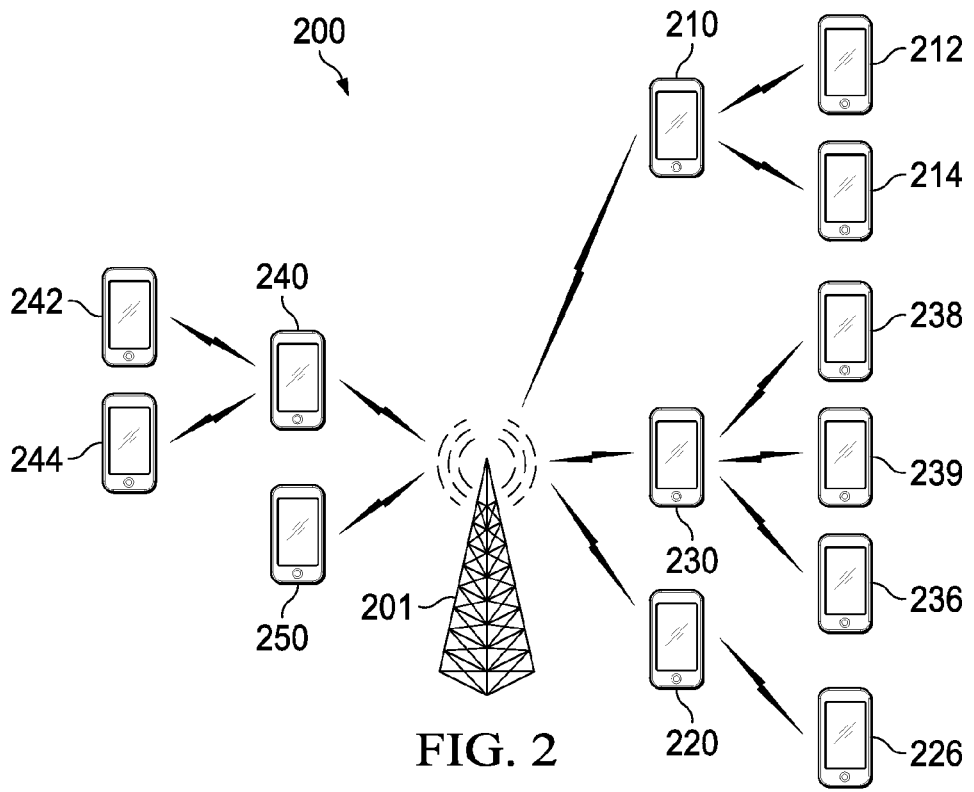
FIG. 2 illustrates a diagram of an embodiment relay-assisted network.

Some networks may use relays to improve performance and/or extend the coverage of a cell. FIG. 2 illustrates a relay-assisted network 200 for communicating data. As shown, the relay-assisted network 200 comprises a base station 201, a plurality of relay terminals 210, 220, 230, 240, 250, and a plurality of mobile devices 212-214, 226, 236-239, 242-244. The relay terminals 210, 220, 230, 240, 250 are configured to relay signals between the base station 201 and the mobile devices 212-214, 226, 236-239, 242-244. As used herein, the term "relay terminal" refers to any wirelessly enabled device configured to relay signals between a base station and one or more mobile devices, such as infrastructure nodes and wireless terminals. Infrastructure nodes include devices that are part of the network infrastructure, e.g., dedicated relay nodes, while wireless terminals include devices that are not directly integrated into the network infrastructure, e.g., mobile devices adapted to perform device-to-device (D2D) or machine-to-machine (M2M) communications, etc.

In this example, the relay terminal 210 is serving the mobile devices 212, 214, the relay terminal 220 is serving the mobile device 226, the relay terminal 230 is serving the mobile devices 236, 238, 239, and the relay terminal 240 is serving the mobile devices 242, 244, while the relay terminal 250 is inactive (e.g., in an idle mode). The relay terminals 210, 220, 230, 240 may communicate with the mobile devices 212-214, 226, 236-239, 242-244 over available resources blocks (RBs). Unless otherwise specified, the term "available resource blocks" is used loosely herein to refer to any network resource adapted to carry data over a wireless interface, including resources defined in the time domain, frequency domain, spatial domain, coding domain, or combinations thereof. In this embodiment, available resource blocks correspond to time-frequency resources in an orthogonal frequency division multiplexing (OFDM) network. For example, resource blocks may correspond to resource blocks of a long term evolution (LTE) radio frame.

When communicated over the same RBs, wireless signals of relay terminals in the same cell may or may not interfere with one another depending on the relative proximity of the corresponding relay terminals and/or mobile devices served by those terminals. In this example, the relay terminals 210, 220, 230 are proximately located with one another such that their respective wireless signals interfere with one another when communicated over common RBs. Conversely, the relay terminals 240, 250 are remotely located with respect to the relay terminals 210, 220, 230 such that wireless signals of those respective group of relay terminals do not interfere with one another when communicated over common RBs.

Available RBs of the relay-assisted network 200 are allocated by the relay terminals 210, 220, 230 in accordance with a set of RB allocation sequences. FIGS. 3A-3D illustrate an example of how the relay terminals 210, 220, 230 allocate resources to the mobile devices 212-214, 226, 236-239 using different RB assignment sequences. As shown in FIG. 3A, the relay terminals 210, 220, and 230 use the RB assignment sequences 310, 320, and 330 (respectively) to allocate resources to the mobile devices 212-214, 226, 236-239. In this example, the mobile devices request a single RB. However, in other examples, mobile devices may request multiple RBs.

FIG. 3B demonstrates how the relay terminal 210 assigns resource blocks to the mobile devices 212, 214 in accordance with the RB assignment sequence 310. As shown, the relay terminal 210 assigns RB-2 to the mobile device 212 and RB-4 to the mobile device 214 in accordance with the RB ordering specified by the RB assignment sequence 310. The occupied RBs are displayed on the graphical representation 300. FIG. 3C demonstrates how the relay terminal 220 assigns RB-6 to the mobile devices 226 in accordance with the RB assignment sequence 320, and FIG. 3D demonstrates how the relay terminal 230 assigns RB-8, RB-9, and RB-6 to the mobile devices 238, 239, and 236 (respectively) in accordance with the RB assignment sequence 330. The RB-6 is assigned to both the mobile device 226 and the mobile device 236, and therefore the respective communications of those devices interfere with one another. This may prompt one or both of the relay terminals 220, 230 to re-assign a different resource block to their corresponding mobile device. For example, the relay terminal 220 may re-assign RB-3 to the mobile device 226 in accordance with the next resource block assignment specified by the RB assignment sequence 320. Likewise, the relay terminal 230 may re-assign RBs to the mobile device 236 in accordance with the RB assignment sequence 330 until no collisions occur.

Sets of RB assignment sequences may be designed to suit network conditions/parameters. Accordingly, a network device (e.g., base-station, central controller, etc.) may be configured to dynamically update the sets of RB assignment sequences when parameters of the network 200 change, e.g., when the number of relay terminals and/or available RBs changes, etc. Aspects of this disclosure provide embodiments methods for efficiently computing sets of RB assignment sequences in accordance with an iterative sequential selection technique.

Figure 4A:
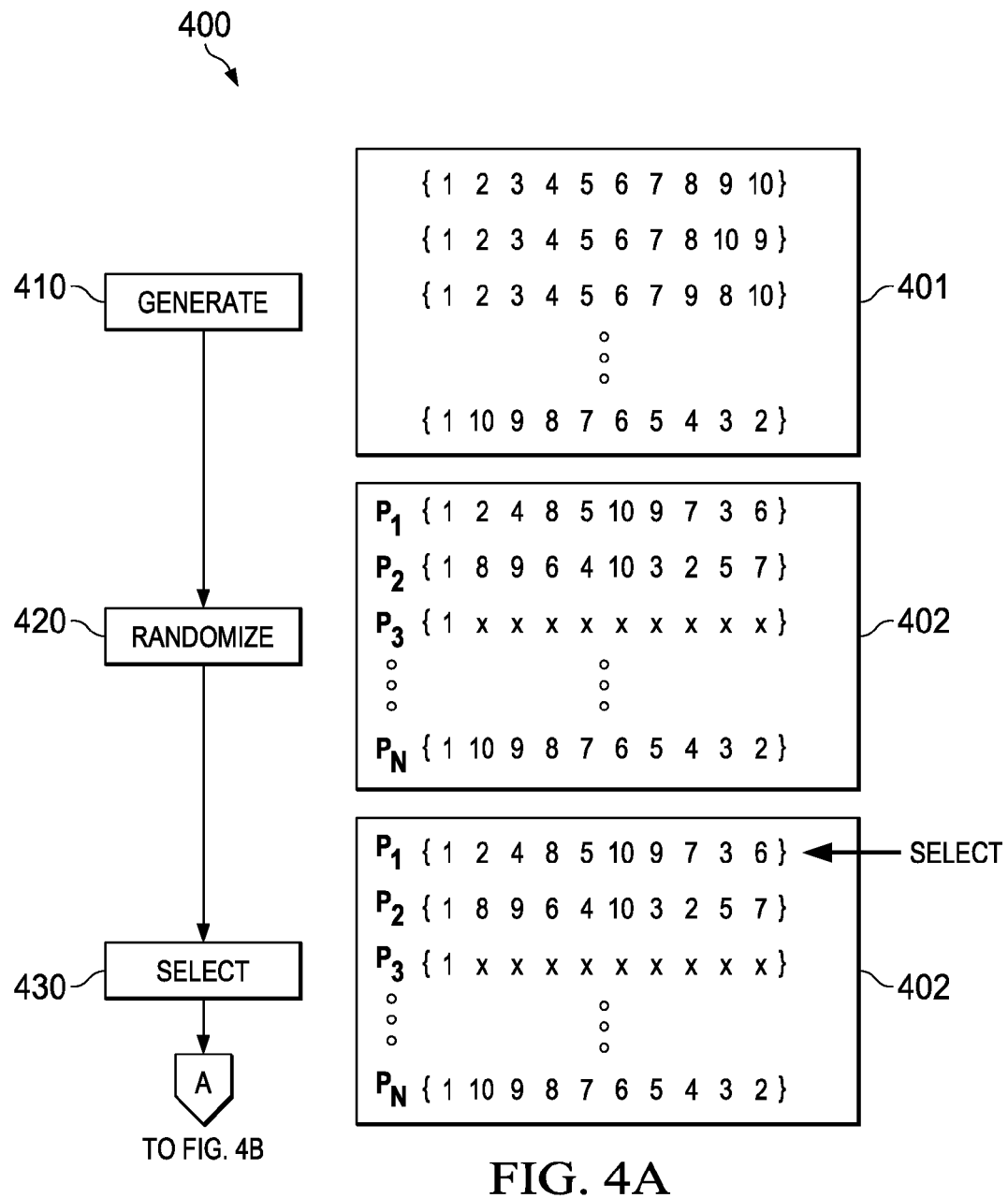
FIGS. 4A-4B illustrate a flowchart of an embodiment method for computing RB assignment sequence lists.
Figure 4B:
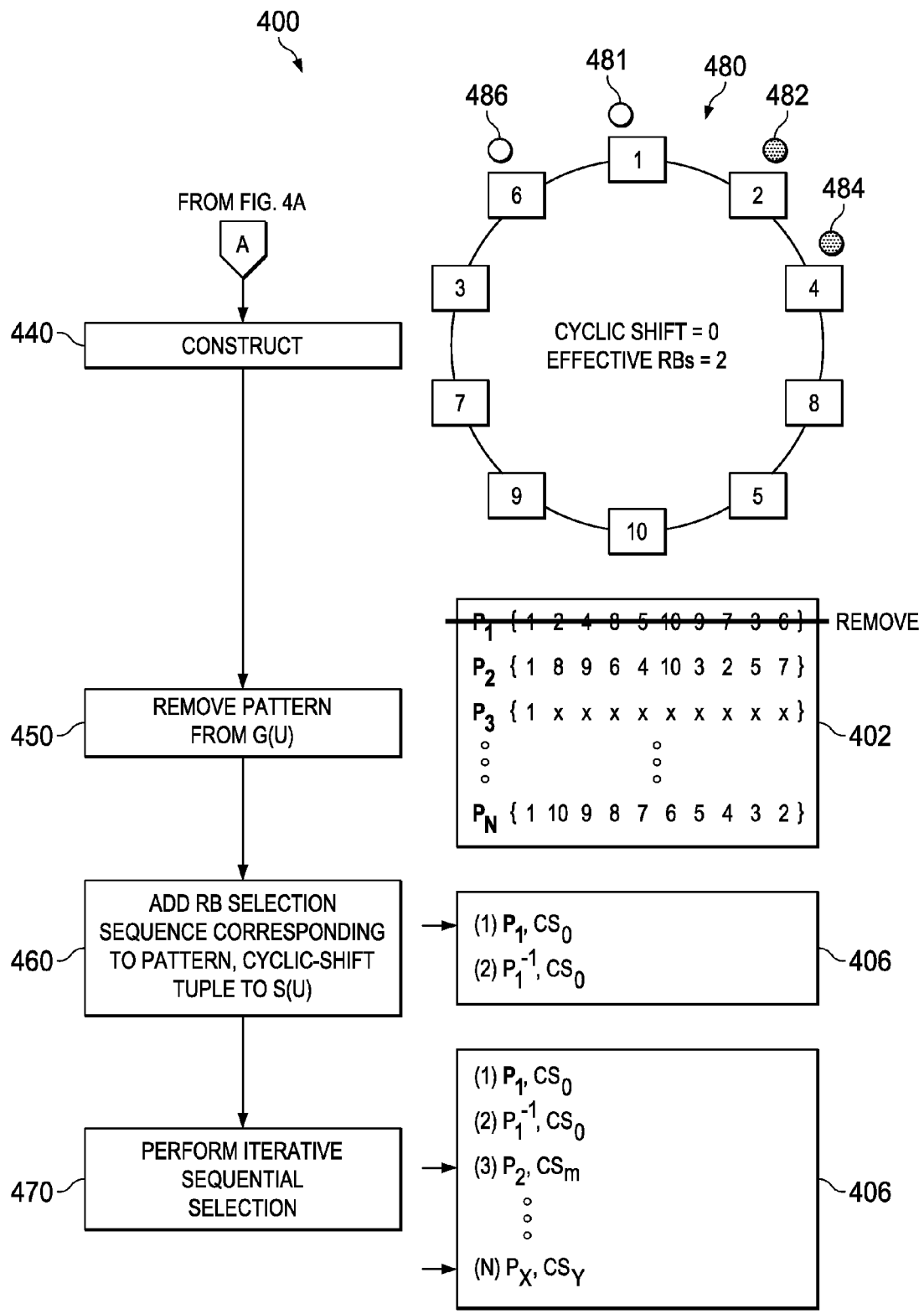

FIGS. 4A-4B illustrate an embodiment method 400 for computing sets of RB assignment sequences in accordance with an iterative sequential selection technique, as may be performed by a network device. As shown, the method 400 begins with step 410, where the network device generates a set of patters 401 for assigning available RBs. Thereafter, the method 400 proceeds to step 420, where the network device generates the patterns to obtain a unitary group of patterns 402. Next, the method 400 proceeds to step 430, where the network device selects a base pattern. In this example, the pattern P1 is selected. In other examples, a different pattern may be selected. Next, the method 400 proceeds to step 440, where the network device constructs a graphical representation of the cyclic group 480 based on the selected base pattern, a cyclic shift, and an effective number of resource blocks. As shown, the graphical representation of the cyclic group 480 positions the available RBs along the circumference of the circle according to an ordering specified by the base pattern. The graphical representation of the cyclic group 480 is constrained by occupied RBs corresponding to the indicators 481, 482, 484, 486. The occupied RBs are defined by the effective number of RBs and the selected cyclic shift as applied to both the selected base pattern and the arithmetic inverse of the base pattern.

In this example, the effective number of RBs is two, and the selected cyclic shift is zero. Moreover, the selected base pattern ($P_1$) is <RB-1, RB-2, RB-4, RB-8, RB-5, RB-10, RB-9, RB-7, RB-3, RB-6>, while the arithmetic inverse of the selected base pattern ($P_1^{-1}$) is <RB-6, RB-3, RB-7, RB-9, RB-10, RB-5, RB-8, RB-4, RB-2, RB-1>. Accordingly, the occupied RBs are defined as the first two RBs (RB-2, RB-4) of P1, as well as the first two RBs (RB-1, RB-6) of $P_1^{-1}$.

After the graphical representation of the cyclic group 480 has been constructed, the method 400 proceeds to step 450, where the selected base pattern P1 is removed from the unitary group. In some embodiments, the formation of the unitary group may occur after selection of the base pattern and formation of the graphical representation of the cyclic group 480. In such embodiments, step 450 is omitted. Next, the method 400 proceed to step 460, where the network device adds RB assignment sequences corresponding to the selected base pattern, cyclic shift tuple to the list of RB assignment sequences 406. In this instance, the first RB assignment sequence is defined by $P_1$ and $CS_0$, and the second RB assignment sequence is defined by $P_1^{-1}$ and $CS_0$. Thereafter, the method 400 proceeds to step 470, where the network device performs iterative sequential selection of remaining patterns in the unitary group to obtain remaining RB assignment sequences in the list of RB assignment sequences 406.

Figure 5A:
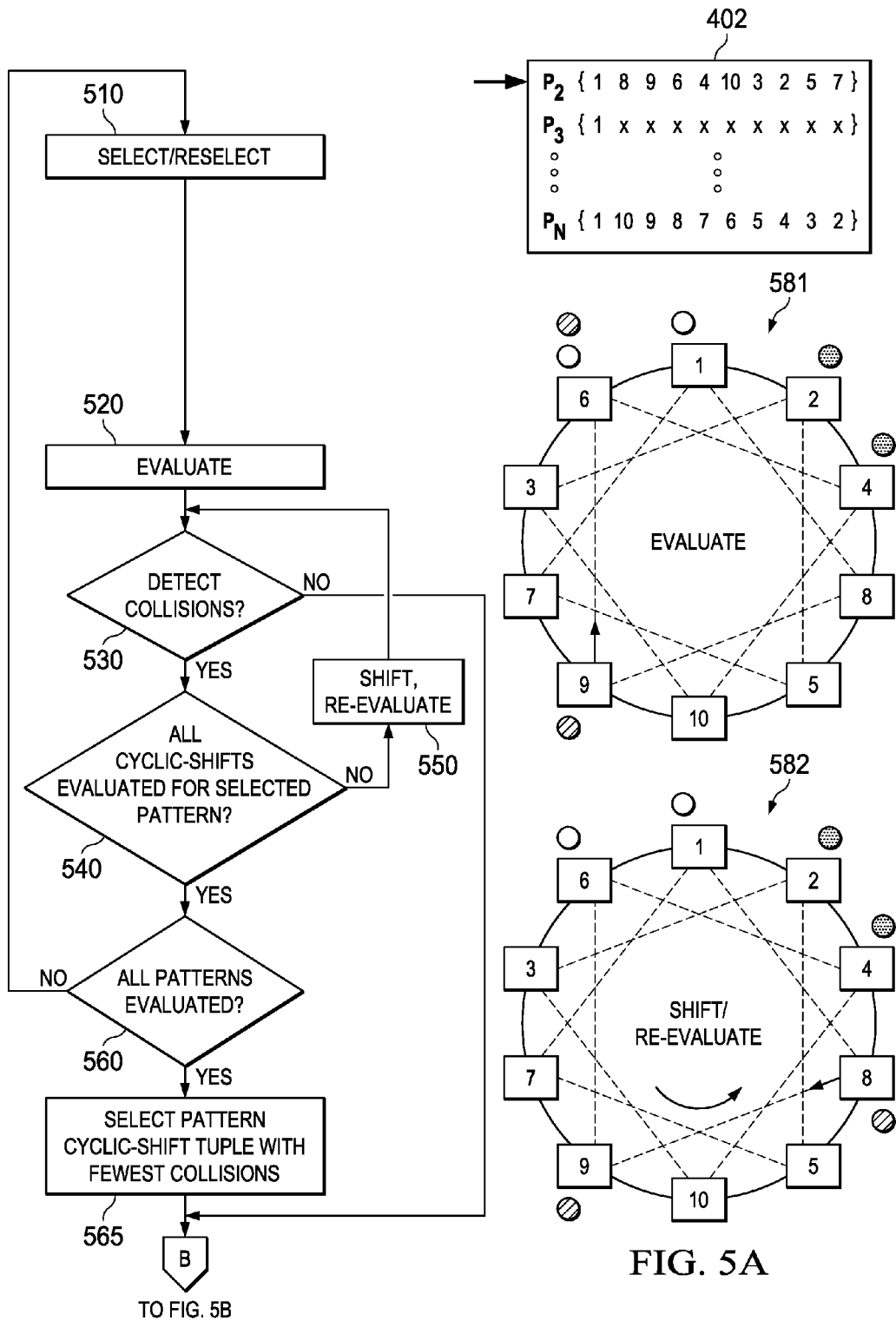
FIGS. 5A-5B illustrates a flowchart of an embodiment method for performing iterative sequential selection.
Figure 5B:
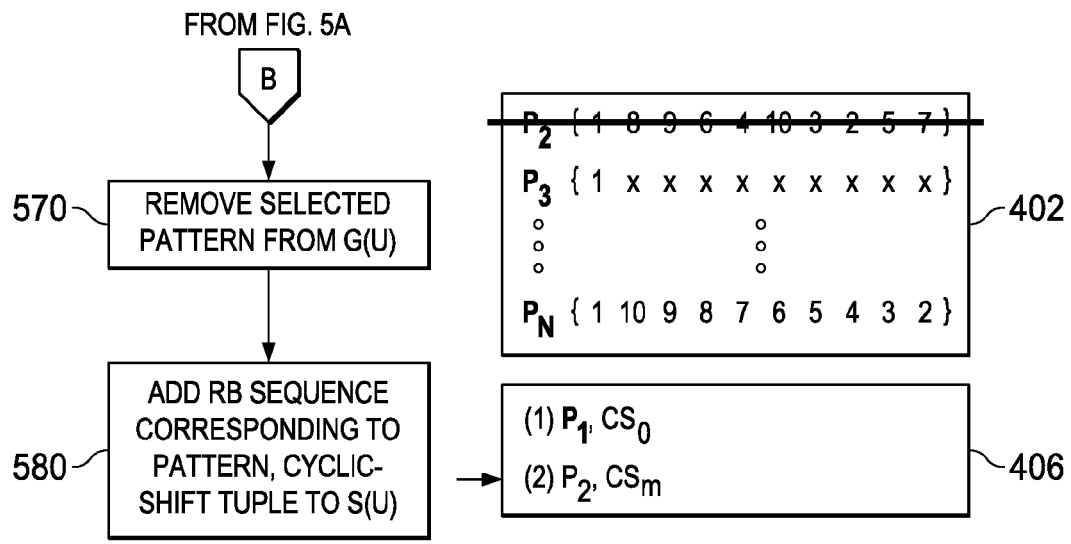

FIGS. 5A-5B illustrates a method 500 for performing iterative sequential selection to obtain the remaining RB assignment sequences in the list of RB assignment sequences 406. As shown, the method 500 begins at step 510, where the network device selects a pattern to evaluate. In this example, the pattern ($P_2$) is selected, as it is the next pattern in the unitary group. In other examples, patterns may be selected in a random fashion. Next, the method 500 proceeds to step 520, where the network device evaluates the selected pattern ($P_2$) in accordance with one of the plurality of possible cyclic shifts. In this example, the selected pattern ($P_2$) is evaluated first using a zero shift, as can be seen by the graphical representation of the cyclic group 581. In other examples, the cyclic shift used to initially evaluate a given pattern may be selected randomly. Next, the method 500 proceeds to step 530, where the device determines whether any collisions occurred. If a collision occurred, then the method 500 proceeds to steps 540-550, where the device determines whether all cyclic shifts have been evaluated, and if not, shifts the selected pattern in accordance with the remaining shifts. If the device determines that all cyclic shifts have been evaluated for the selected pattern, then the method 500 proceeds to step 560, where the device determines whether all patterns have been evaluated during the current iteration. If not, then the method reverts back to step 510, where another pattern is selected for evaluation. If all remaining patterns in the unitary group have been evaluated during this iteration, then the method 500 proceeds to step 565, where the pattern, cyclic-shift tuple having the least number of collisions is selected. Once a pattern, cyclic-shift tuple having zero collisions (or the least collisions) is identified in step 530 (or step 565), the method 500 proceeds to steps 570-580, where the corresponding pattern is removed from the unitary group, and the corresponding RB assignment sequence is added to the list of RB assignment sequences.

In the example iteration depicted by FIGS. 5A-5B, the selected pattern, cyclic-shift tuple ($P_2$, $CS_0$) is determined to produce a collision at RB-6 during the step 530, as shown in the graphical representation of the cyclic group 581. Accordingly, the pattern $P_2$ is shifted by a cyclic-shift (M) as shown by the graphical representation of the cyclic group 582, and re-evaluated, at which point the selected pattern, cyclic-shift tuple ($P_2$, $CS_M$) is determined to produce no collisions. As such, an RB assignment sequence corresponding to the selected pattern, cyclic-shift tuple ($P_2$, $CS_M$) is added to the list of RB assignment sequences, and the pattern $P_2$ is removed from the unitary group. At this point, the unitary group ($P_3 \ldots P_N$) is ready to be evaluated during the next iteration.

Figure 6:
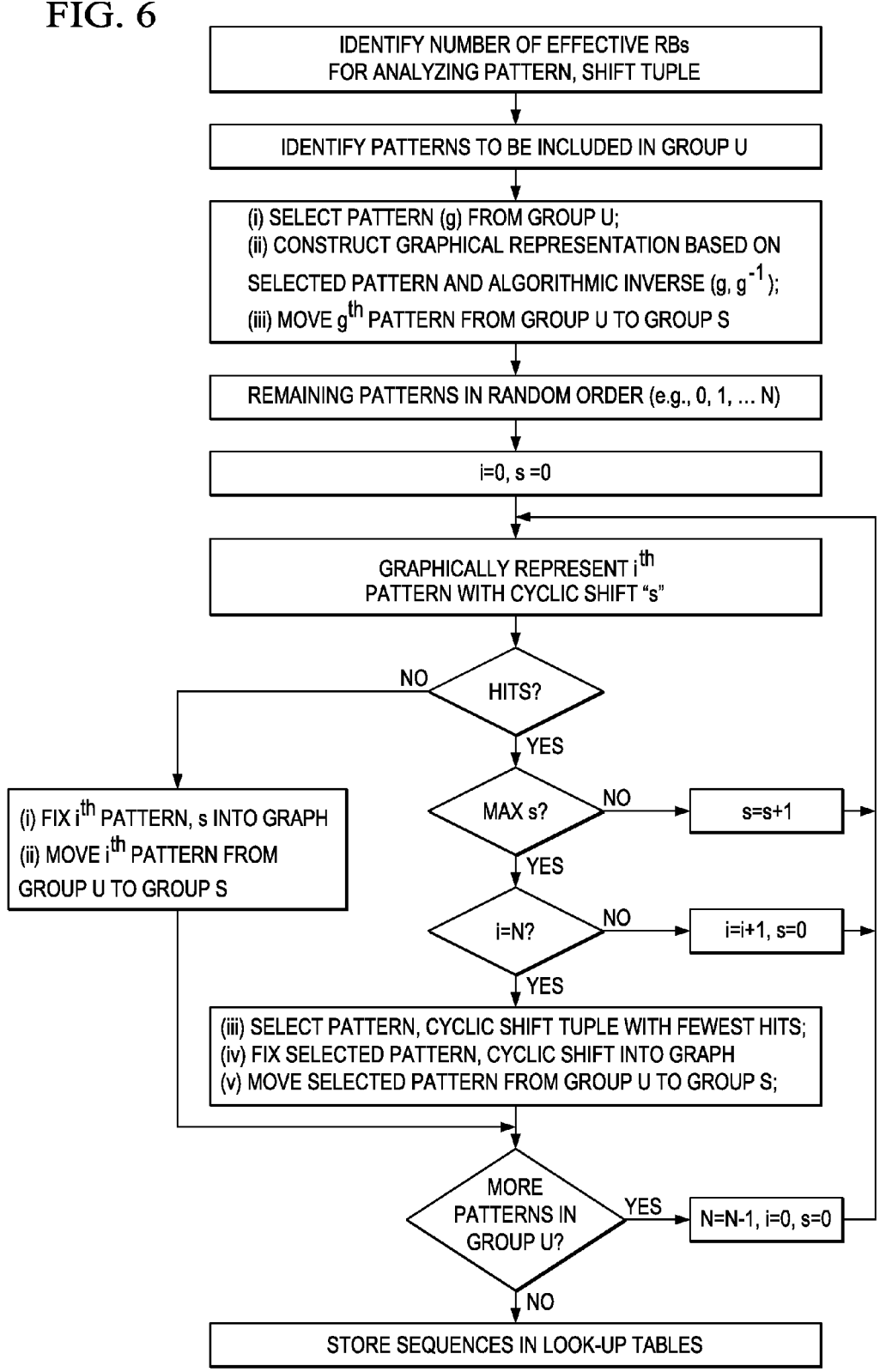
FIG. 6 illustrates a flowchart of an embodiment algorithm for performing iterative sequential selection to select RB assignment sequences.

FIG. 6 illustrates a flowchart of an embodiment algorithm for performing iterative sequential selection to obtain a list of RB assignment sequences. The steps of this method are self-explanatory, and are not repeated verbatim herein.

Notably, under high interference (e.g., large number of relay terminals), the number of virtual resources can be increased by joining the resources over multiple time slots. This can be detected by the number of hits. When this number is higher than a certain threshold, it can be seen that there is more users and more wastage of resources due to collisions. Therefore, it may be advantageous to allocate more RBs to increase the number of available RBs. This can be done by combining time and frequency as resources and repeating them over certain time slots (e.g. TTIs in LTE). For example, in LTE 10 MHz band there are 50 RBs. We can increase the number of virtual RBs to 100 by combining RBs of 2 TTIs.

The remaining portions of this disclosure corresponding significantly to a pre-published version of an academic paper, and serve to supplement this disclosure without limiting the claimed invention in any way. Terminal relaying is expected to offer an effective means for realizing machine-to-machine (M2M) communications in future wireless cellular networks. In the absence of channel quality indicators, the effective utilization of relaying terminals (RTs) requires a mechanism by which the RTs can assign available resource blocks (RBs) to a potentially large number of M2M devices with minimal conflicts. This requires optimizing RB assignments over a large set of lengthy sequences. One technique for selecting assignment sequences is based on an exhaustive search of exponential complexity over sequences generated by multiplicative cyclic groups. This technique imposes a relatively stringent constraint on the number of RBs and does not consider sequences generated using other group operations. Aspects of this disclosure use group isomorphism to eliminate the constraint on the number of RBs and to show that the optimal assignment sequences generated by a specific cyclic group are globally optimal over the set of all cyclically-generated sequences. Aspects of this disclosure provide a greedy algorithm with linear complexity for the sequential selection of RB assignment sequences in systems with large numbers of RTs and RBs. Aspects of this disclosure provide a simplified selection metric by invoking the graphical representation of cyclic groups. Numerical results show that the performance of the sequences generated by the greedy algorithm is comparable to that of those generated by exhaustive search, but with much less computational cost.

Machine-to-machine (M2M) communications may empower a wide range of important future applications, including smart electrical grids and intelligent transportation systems. Such applications will involve the communication between large numbers of low-power geographically dispersed M2M devices. The communication between these devices can be facilitated by utilizing the currently available cellular infrastructure. However, this structure has two major drawbacks: first, the transmission power of the M2M devices may not be sufficient to communicate directly with the base station (BS); and second, the prospective large number of M2M devices communicating simultaneously with the BS may result in heavy interference. These drawbacks can be mitigated by utilizing a terminal relaying scheme, wherein an inactive wireless user terminal assists the communication of its neighboring M2M devices by relaying their signals to the BS. Using terminal relaying, the M2M devices in each cell are grouped into clusters, where each cluster is served with a relaying terminal (RT) that acts as the cluster head. Each of these RTs aggregates data from the M2M devices within its cluster and relays it to the BS. Since each M2M device communicates only with its neighboring RT, terminal relaying significantly reduces the transmission power required for communicating with the BS. Furthermore, the number of M2M devices within a cluster is expected to be lower than that within the entire service region of a BS. This reduces the number of M2M devices attempting simultaneous communication with the BS, which subsequently reduces the interference at the BS. Despite its potential advantages, the efficient implementation of terminal relaying in an M2M framework requires a mechanism by which the RTs can allocate the available (time-frequency) resource blocks (RBs) to the M2M devices that they assist.

When instantaneous channel quality indicators (CQIs) are available, the RBs can be allocated either centrally by the BS or in a distributed manner by the RTs. However, in practice, acquiring this information incurs a significant overhead and can seriously infringe on the resources available for communication. This is especially true when the RTs and M2M devices are mobile and their numbers are large; e.g., relay-assisted M2M communication systems. Hence, to extract the potential gains of terminal relaying, it is desirable to design a computationally efficient scheme by which the RBs can be allocated blindly, i.e., without CQIs, and autonomously, i.e., without centralized coordination.

In the absence of CQIs, autonomous RB allocation schemes that use random RB assignments are available. Other examples of random access schemes include ALOHA and Slotted-ALOHA in which wireless devices transmit their data over randomly selected RBs. These schemes offer a significant reduction in the overhead necessary for centralized coordination and CQI acquisition, but the lack of coherence in their structure results in, otherwise avoidable, RB allocation conflicts. This drawback of the random schemes is alleviated by the one proposed in, wherein the RB assignment sequences are endowed with a multiplicative cyclic group (MCG) structure. This structure may be used to obtain cyclically-generated RB assignment sequences and an exhaustive search was performed to select the sequences that minimize the number of RB allocation conflicts between the RTs. Despite its advantages, when the number of RTs increases, the cost of exhaustive search over cyclically-generated sequences becomes practically infeasible.

Aspects of this disclosure can be used in a distributed relay-assisted cellular system that supports M2M communications. In this system, the CQIs are assumed to be neither available at the RTs nor at the BS. Each RT locally assigns RBs to its incoming M2M devices according to a prescribed cyclically-generated RB assignment sequence; i.e., without centralized coordination by the BS. These cyclic sequences are generated at the RTs by using the properties of cyclic groups with a particular group operation. However, some group operations impose constraints on the number of system RBs; e.g., multiplication constrains the number of system RBs to be a prime minus one. To alleviate this constraint, aspects of this disclosure use a property of cyclic groups, namely, group isomorphism, to show that the performance of cyclically-generated assignment sequences is independent of the underlying group operation. A direct consequence of this observation is that the optimal assignment sequences obtained by searching over the set of sequences generated by a specific cyclic group are globally optimal over the set of all cyclically-generated sequences of the same number of elements. Embodiments of this disclosure provided a computationally efficient technique that enables the design of RB assignment sequences for networks with large numbers of RTs and RBs. In particular, aspects of this disclosure develop a greedy algorithm, whereby the RB assignment sequences are cyclically-generated in an efficient manner that relies on the structure of cyclic groups and the sequential assessment of the number of assignment conflicts between the sequences. Since the assignment sequences generated by the proposed algorithm are obtained from distinct group generators and cyclic shifts, the quest for designing sequences is reduced to the quest for finding group generators and cyclic shifts that result in minimal assignment conflicts. In each iteration of the proposed algorithm, a pair of group generators is chosen such that the number of assignment conflicts between the sequences that they generate and the ones generated by the previously selected group generators is minimized. The selected group generators are then ranked in a look-up table in an ascending order of their observed number of assignment conflicts. To further simplify the design, aspects of this disclosure introduce an approximate selection metric for the greedy algorithm. In particular, aspects of this disclosure invoke a graphical representation of cyclic groups to gain insight into their structure, and to subsequently develop a graphical selection metric for the group generators and cyclic shifts.

Numerical results suggest that the performance of the sequences generated by the proposed greedy algorithm is comparable to that of the sequences generated by exhaustive search, but with a significantly less computational cost. In particular, the computational complexity of the proposed greedy algorithm is linear, whereas that of the proposed exhaustive search is exponential. Furthermore, the proposed greedy algorithm does not require active RTs to update their RB assignment sequences when new RTs access the system. In particular, for a network with a given number of RBs, the look-up table provided by the algorithm contains all the generators of the corresponding cyclic group. When a new RT enters the system at any given instant, it uses the first unutilized group generator for obtaining its RB assignment sequence. This is in contrast with the exhaustive search, which necessitates that all active RTs update their assignment sequences when new RTs enter the system. The contributions of this paper can be summarized by the following key points: The restriction imposed by the MCG structure on the number of RBs to be a prime minus one is alleviated; a property of cyclic groups is utilized to show that performing an exhaustive search over the set of sequences generated by a specific cyclic group is sufficient to guarantee optimality over the set of all cyclically-generated sequences; a greedy algorithm is proposed that yields RB assignment sequences with performance comparable to that of the sequences generated by exhaustive search, but with a significantly lower computational complexity; and a simplified graphical sequences selection metric is developed by invoking the graphical representation of cyclic groups.

Aspects of this disclosure provide techniques for autonomous RB assignment using cyclically-generated sequences. An autonomous RB assignment scheme for the uplink of a relay-assisted cellular network that supports M2M communications. An RT is selected by an active M2M device according to the observed signal strength. The RT does not have access to the CQIs and, once selected, it allocates one or multiple RBs to the M2M device, depending on the data rate requirement thereof. To maintain autonomy, RB assignments can be performed randomly or according to prescribed assignment sequences, with entries corresponding to available RBs. In either approach, no coordination with the BS or other RTs is required. This autonomy might result in instances at which one RB is assigned to multiple M2M devices simultaneously. Occurrence of such an instance, referred to as a 'hit', is likely to result in high interference levels and significantly deteriorates the quality of the signal observed by the devices. Unlike the random approach, which does not offer performance guarantees, using prescribed sequences provides an opportunity for improving performance. This can be done by properly selecting the RB assignment sequences to minimize hit occurrences even though the CQIs are not available. Unfortunately, optimizing the assignments of these RBs over all possible sequences constitutes a formidable task that, for a network with N RBs and M RTs, requires exhaustive search over $$\binom{N!}{M}$$

combinations of sequences. When the number of RTs is small, e.g., M=4 RTs, a more practical approach is the one in which the exhaustive search is restricted to cyclically-generated sequences, that is, sequences generated from a single element in the sequence.

An instance of such sequences are the pseudonoise (PN) sequences that are commonly used in Frequency Hopping (FH) systems. However, the selection of PN sequences that are 'good' for FH systems is based on the number of collisions in a communication scenario that differs significantly from the RB assignment one. In particular, in FH systems, a wireless device occupies a particular frequency slot during one dwell interval, and relinquishes it after that, whereas in relay-assisted RB assignment, a wireless device is assumed to retain its assigned RBs during the entire transmission interval. The following examples are provided to discuss preliminaries pertaining to the generation of cyclic RB assignment sequences.

Example 1

A group G is a set on which a group operation (denoted by juxtaposition) is defined such that: G is associative; for all $(x,y) \in G \times G$, $xy \in G$; and the inverse for each element is in G. The order of G is the number of its elements. Cyclic RB assignment sequences are generated from a particular class of groups known as cyclic groups, which are defined next.

Example 2

A group G is cyclic if all its elements can be generated by repeated application of the group operation on one element in G. Such an element is called a group generator. For a cyclic group G of order N, the number of group generators is given by the Euler Totient function, $\phi(N)$.

Example 3

Given a positive integer N, the Euler Totient function, $\phi(N)$, is the cardinality of the set of integers that are coprime with N; that is, $\phi(N)$ is the cardinality of the set $\{q<N|gcd(q,N)=1\}$, where $gcd(q,N)$ is the greatest common divisor of q and N.

Immediate from Example 2 is that repeatedly applying the group operation on one of the generators of a group G with order N yields an N-entry cyclic sequence that spans all the elements of G. Hence, to study a cyclically-generated sequence for a network with N RBs, it suffices to consider the order-N cyclic group that generates it. In particular, given a distinct group generator, each RT can generate a cyclic sequence that spans all the RBs available to the network, and the quest for optimal cyclic sequences is distilled to the quest for optimal generators and group operation. Cyclically-generated sequences may be obtained using the MCG structure. These sequences were enriched by considering cyclically shifted versions thereof. In particular, applying a cyclic shift, s, to a sequence, cyclically rotates its entries by s slots, where $s \in \{0, \ldots, N-1\}$. Group generators and cyclic shifts may be chosen by exhaustive search to ensure a minimal number of hit occurrences. Despite its advantages in minimizing hit occurrences, performing an exhaustive search over all cyclically-generated sequences by the MCG structure incurs a computational complexity that prohibits its utilization in systems with practical numbers of RTs. Moreover, restricting RB assignments to sequences generated by the MCG structure imposes a constraint on the number of RBs of the system and limits the optimality guarantee to the MCG structured sequences. These drawbacks will be alleviated by the techniques proposed hereinafter.

The restriction of the cyclically-generated RB assignment sequences to the MCG structure results in two drawbacks: first, the number of RBs, N, must be equal to P−1, where P is a prime number; and second, it limits the search for the optimal group generators to those of the MCG with order N=P−1. Consequently, performing an exhaustive search over this subset of cyclic group generators would only guarantee optimality with respect to the MCG structure.

These drawbacks can be alleviated by extending the search for RB assignment sequences to the set of all cyclically-generated sequences. This extension eliminates the constraint on the number of RBs and ensures that exhaustive search yields the globally optimal RB assignment sequences over the set of all cyclically-generated sequences. The key to this extension is the observations that the performance of an RB assignment sequence depends solely on the sequence structure, but not on its actual entities, and that this structure is independent of the group operation. The latter observation follows from a basic property of cyclic-groups known as group isomorphism, which is described next.

A basic result in group theory asserts that there exists a structure-preserving function that maps the entities of one cyclic group to another with the same order. This function is referred to as group isomorphism, which is formally defined as follows.

Example 4

Let G and $\bar{G}$ be two cyclic groups of the same order. An isomorphism $F: G \to \bar{G}$ is a one-to-one and onto map that respects the group operation, that is, if $x, y \in G$, then $F(x), F(y) \in \bar{G}$ and $F(xy)=F(x)F(y)$. W Note that, despite using juxtaposition to denote the group operations in both G and $\bar{G}$, these operations are generally different.

Example 4 implies that the isomorphism F can be considered as a relabelling function that maps every element in G to an element in $\bar{G}$. Similarly, Examples 2 and 3 imply that there are $\phi(N)$ distinct cyclic sequences, each corresponding to a distinct group generator. Notice that, while the set of group generators of a cyclic group depends on the underlying group operation, the cardinality of this set, $\phi(N)$, does not depend on that operation. Hence, restricting attention to cyclically-generated sequences, reduces the number of candidate RB assignment sequences from N! to $\phi(N)$. The entries of these $\phi(N)$ sequences depend on the group operation, and determining the optimal operation to consider remains an ostensibly daunting task. Fortunately, however, it can be shown that determining which operation to consider is immaterial. The key step to show that follows from the following lemma.

Lemma 1: Any cyclic group, $A_N$, of order N is isomorphic to the additive cyclic group (ACG), $(Z_N,+)=\{0, 1, 2, \ldots, N-1\}$, irrespective of the group operation that underlies $A_N$. Using Lemma 1 and Example 4 produces the following theorem.

Theorem 1: For any cyclic group $G_N$ of order $N_5$ there exists an isomorphism F such that the set of sequences that are cyclically-generated by the group operation underlying $G_N$ is isomorphic to the set of sequences that are cyclically-generated by the additive group operation underlying $Z_N$.

It can be shown that the isomorphism, F, in this theorem may not be unique, and hence, a given cyclically-generated sequence in $G_N$ may be isomorphic to a different cyclically-generated sequence in $Z_N$ when F changes. However, for any cyclic group $G_N$, there exists at least one isomorphism which maps the set of all its cyclically-generated sequences to the unique set of cyclically-generated sequences of $Z_N$ Before discussing the implications of Theorem 1 on the proposed technique for assigning RBs, it is verified with an illustrative example.

Example 5

Consider two cyclic groups, $G_N$ and $Z_N$ of order N=10 with multiplicative and additive group operations, respectively. From Example 3, the number of cyclically-generated sequences by both groups is given by $\phi(10)=4$. First, for the MCG structure, the set of cyclically-generated sequences can be obtained by utilizing the following equation $\{g_i^{(k+s_i)}(\mod N+1)\}_{k=1}^N=\{1,\ldots,N\}$, (1), where $g_i$ is the $i^{th}$ group generator of $G_N$ and $s_i$ is the assigned cyclic shift for its cyclically-generated sequence. For ease of exposition, in this example all cyclic shifts are set to 0. Accordingly, the set of cyclically-generated sequences by the MCG, $G_{10}$, are given by the following table:

| | | | | | | | | | | |
|---|---|---|---|---|---|---|---|---|---|---|
| ($g_1 = 2, s_1 = 0$) | 2 | 4 | 8 | 5 | 10 | 9 | 7 | 3 | 6 | 1 |
| ($g_2 = 6, s_2 = 0$) | 6 | 3 | 7 | 9 | 10 | 5 | 8 | 4 | 2 | 1 |
| ($g_3 = 7, s_3 = 0$) | 7 | 5 | 2 | 3 | 10 | 4 | 6 | 9 | 8 | 1 |
| ($g_4 = 8, s_4 = 0$) | 8 | 9 | 6 | 4 | 10 | 3 | 2 | 5 | 7 | 1 |

Similarly the set of cyclically-generated sequences by the ACG structure can be obtained by utilizing $\{g_i(k+s_i)(\mod N)\}_{k=1}^N=\{0,\ldots,N-1\}$, (2), where $g_i$ is the $i^{th}$ group generator of $Z_N$ and $s_i$ is the assigned cyclic shift for its cyclically-generated sequence. Accordingly, the set of cyclically-generated sequences by the ACG structure $Z_{10}$, is given in the following table:

| | | | | | | | | | | |
|---|---|---|---|---|---|---|---|---|---|---|
| ($g_1 = 1, s_1 = 0$) | 1 | 2 | 3 | 4 | 5 | 6 | 7 | 8 | 9 | 0 |
| ($g_2 = 3, s_2 = 0$) | 3 | 6 | 9 | 2 | 5 | 8 | 1 | 4 | 7 | 0 |
| ($g_3 = 7, s_3 = 0$) | 7 | 4 | 1 | 8 | 5 | 2 | 9 | 6 | 3 | 0 |
| ($g_4 = 9, s_4 = 0$) | 9 | 8 | 7 | 6 | 5 | 4 | 3 | 2 | 1 | 0 |

Considering the following isomorphism mapping function:
$F:G_{10} \to Z_{10}$: $F((g_1=2)^k \pmod{N+1})=k(\mod N)$, the elements of the two group structures can be mapped as shown in the following table:

| | | | | | | | | | | |
|---|---|---|---|---|---|---|---|---|---|---|
| MCG | 2 | 4 | 8 | 5 | 10 | 9 | 7 | 3 | 6 | 1 |
| ACG | 1 | 2 | 3 | 4 | 5 | 6 | 7 | 8 | 9 | 0 |

Applying this mapping to the set of cyclically-generated sequences by the MCG structure yields the one generated by the ACG structure. Note that the sequence to sequence mapping is not unique, however under any isomorphism function F, the complete set of cyclically-generated sequences by the ACG structure will be obtained from the one generated by the MCG structure.

To illustrate the implications of Theorem 1, consider a relay-assisted cellular network that utilizes cyclically-generated RB assignment sequences. The number of hits incurred by the RTs in the system will depend only on the relative locations of the RBs in the exploited sequences. This implies that changing the labels of the entries within the sequences will not affect the number of incurred hits. Furthermore, Theorem 1 states that there exists an isomorphism between the set of cyclically-generated sequences by any group structure G and the additive cyclic group Z of the same order. Since this isomorphism is one to one and onto, it will preserve the relative locations of the entries of the sequences. In other words, the set of cyclically-generated sequences of order N will always have the same structure irrespective of the underlying group operation. Hence, performing an exhaustive search over the set of cyclically generated-sequences by $Z_N$ guarantees optimality over the set of all cyclically-generated sequences of order N. Despite its optimality guarantee, performing this exhaustive search is computationally prohibitive for large numbers of RTs. Hence, a greedy algorithm that significantly reduces the computational cost of the sequences selection process is needed.

To facilitate the assignment of RBs in practical terminal relaying scenarios, an efficient greedy algorithm is proposed in which cyclically-generated sequences are selected sequentially. The performance of this algorithm is comparable to that of exhaustive search, but its computational complexity is significantly less. This property renders the greedy algorithm attractive for practical application in systems with relatively large numbers of RTs and RBs.

The implementation of the greedy algorithm relies on a technique for pairing group generators and cyclic shifts such that their cyclically-generated sequences are reversed in order. In each iteration of the greedy algorithm, one pair of group generators and the associated cyclic shifts are chosen. This implies that the algorithm exhausts all possible group generator pairs in $$\frac{\phi(N)}{2}$$

iterations.

Having paired the group generators, in the first iteration of the algorithm, a pair is arbitrarily selected, along with a cyclic shift s=0, to be the initial basis of the algorithm. In each of the remaining $$\frac{\phi(N)}{2}-1$$

iterations, the algorithm augments its basis by one pair of group generators and the associated cyclic shifts. In particular, in the r-th iteration, one of the remaining $$\frac{\phi(N)}{2} - (r-1)$$

group generator pairs is selected, along with a particular cyclic shift. The selection technique in these iterations will be discussed below in more detail. The selected group generator pairs, along with their cyclic shifts, are then tabulated in a look-up table according to the order with which they were selected. For a system with M RTs, the M sequences that are cyclically-generated by the first M/2 group generator pairs and cyclic shifts in the table are utilized for assigning RBs.

Our pairing methodology is based on finding the optimal generators for the two-relay case. In that case, the quest for the optimal cyclically-generated sequences can be distilled to a quest for two assignment sequences that proceed in reversed orders. In particular, when these two sequences are utilized for autonomous RB assignment, no hits will be observed as long as the number of WTs is less than the number of available RBs. Since each of these cyclic sequences is generated by a group generator and a cyclic shift, it is required to find two group generators and their associated cyclic shifts that would generate reversed sequences. For any group generator g and cyclic shift s, there exists a unique inverse $(g^{-1}, s^{-1})$ that generates the same sequence but in the reversed order, where $g^{-1}$ is the modular arithmetic inverse of g satisfying: $gg^{-1} \equiv e$ (mod N+1), (3), where e is the group identity element and N is the order of the group. It can be readily shown that the sequences generated by g and $g^{-1}$ proceed in reversed orders. Hence, the cyclic shift assigned to $g^{-1}$, denoted by $s^{-1}$, must be in the direction opposite to the one assigned to g. This cyclic shift can be expressed as $s^{-1} = N - s - 1$. For example, for an MCG of order N=10, the formula in (1) yields the following sequences, which are optimal for the two-relay case.

| (g = 2, s = 0) | 2 | 4 | 8 | 5 | 10 | 9 | 7 | 3 | 6 | 1 |
| ($g^{-1}$ = 6, $s^{-1}$ = 9) | 1 | 6 | 3 | 7 | 9 | 10 | 5 | 8 | 4 | 2 |

Sequential selection of assignment sequences: Let S be the set containing the already selected algorithm basis and U be the set containing the group generator pairs that have yet to be selected. At first, S is empty and U contains the $$\frac{\phi(N)}{2}$$

group generator pairs. In the first iteration, the greedy algorithm arbitrarily selects a pair of group generators $(g, g^{-1})$ from U and a cyclic shift s and moves $(g, g^{-1}, s, s^{-1})$ to S. Without loss of generality, s can be set equal to 0 and $s^{-1}$ to N−1. In each of the subsequent $$\frac{\phi(N)}{2} - 1$$

iterations, the algorithm examines each of the remaining group generator pairs, i.e., the ones not already in S, for all possible cyclic shifts $s \in \{0, \ldots, N-1\}$. In particular, the algorithm evaluates the number of pairwise hits between the sequences generated by each of the remaining group generator pairs and the individual group generator pairs in S over all possible cyclic shifts. Note that for the algorithm to be able to adapt to both, uniform and non-uniform WT distributions, the metric for choosing the group generator pairs and cyclic shifts must not depend on the instantaneous loads of RTs. Hence, when evaluating the number of pairwise hits for a group generator pair, the algorithm considers all possible distributions of the system load over the RTs.

Since the two sequences generated by $(g, g^{-1}, s, s^{-1})$ proceed in reversed orders, it can be shown that both sequences incur the same number of pairwise hits with those generated by each of the group generator pairs and cyclic shifts in S. Hence, it suffices to evaluate the number of pairwise hits between the sequences obtained by only one of the group generators of the pair being examined and the ones obtained by the individual pairs in S. This resembles a 3 RT setup, wherein 2 RTs are assigned a pair from S, and the third RT is assigned a group generator from the examined pair. To evaluate the number of pairwise hits, an N×N load matrix, $X_i$, is associated with the i-th RT, which is assumed to have a group generator $g_i$ and a cyclic shift $s_i$. In particular, the row and column indices of $X_i$ represent the RB and the load level of RT i, respectively. In particular, the $(l_1, l_2)$-th entry of $X_i$ represents the binary state of RB $l_1$ when the load level of RT i, is $l_2$. This entry will be set equal to 1 if RB $l_1$ is assigned by RT i, when it is loaded with $l_2$ WTs. Similarly, this entry will be set equal to 0 if RB $l_1$ is not assigned by RT i, when it is loaded with $l_2$ WTs. Using this notation, the $(l_1, l_2)$-th entry of $X_i$ can be written as $$[X_i]_{\ell_1, \ell_2} = \begin{cases} 1 & \text{if } \ell_1 \in S(\ell_2), \text{ and} \\ 0 & \text{otherwise,} \end{cases}$$

where $S(l_2) = \{g_i^{k+s_i} (\text{mod } N+1)\}_{k=1}^{l_2}$. To elaborate, suppose that the group generator and cyclic shift pairs $(g_i, s_i)$ and $(g_j, s_j)$ yield the assignment sequences (1,3,2,4) and (3,2,4,1) for the i-th and j-th RTs, respectively. The corresponding load matrices, $X_i$ and $X_j$, are $$X_i = \begin{bmatrix} 1 & 1 & 1 & 1 \\ 0 & 0 & 1 & 1 \\ 0 & 1 & 1 & 1 \\ 0 & 0 & 0 & 1 \end{bmatrix}, \text{ and } X_j = \begin{bmatrix} 0 & 0 & 0 & 1 \\ 0 & 1 & 1 & 1 \\ 1 & 1 & 1 & 1 \\ 0 & 0 & 1 & 1 \end{bmatrix}. \quad (4)$$

The inner product of the $l_1$-th column of $X_i$ and the $l_2$-th column of $X_j$ yields the number of hits when RTs i and j are loaded by $l_1$ and $l_2$ WTs, respectively. This product is given by the $(l_1, l_2)$-th entry of the pairwise hit matrix $H_{i,j}$, where $H_{i,j} = X_i^T X_j$. (5). Before showing how the $\{H_{i,j}\}$ matrices can be used to evaluate the total pairwise number of hits over all possible load combinations of a fully loaded system, first it is helpful to distinguish between the system load and the actual number of RBs assigned at each relay. This is because, the number of hits incurred by an RT results in an increase in the number of RBs that this RT tries to assign. In particular, when a hit occurs at an RB, say R̂B, the RT, which was second to attempt assigning R̂B, relinquishes it and assigns the following RB in its assignment sequence. Hence, the actual number of RBs that each RT attempts to assign might be larger than its load. To illustrate, consider an example in which 2 RTs and their RB assignment sequences are as follows.

| Load | 1 | 2 | 3 | 4 | 5 | 6 |
|---|---|---|---|---|---|---|
| RT 1 | 2 | 4 | 7 | 6 | 8 | 3 |
| RT 2 | 7 | 4 | 2 | 3 | 8 | 6 |

Figure 7:
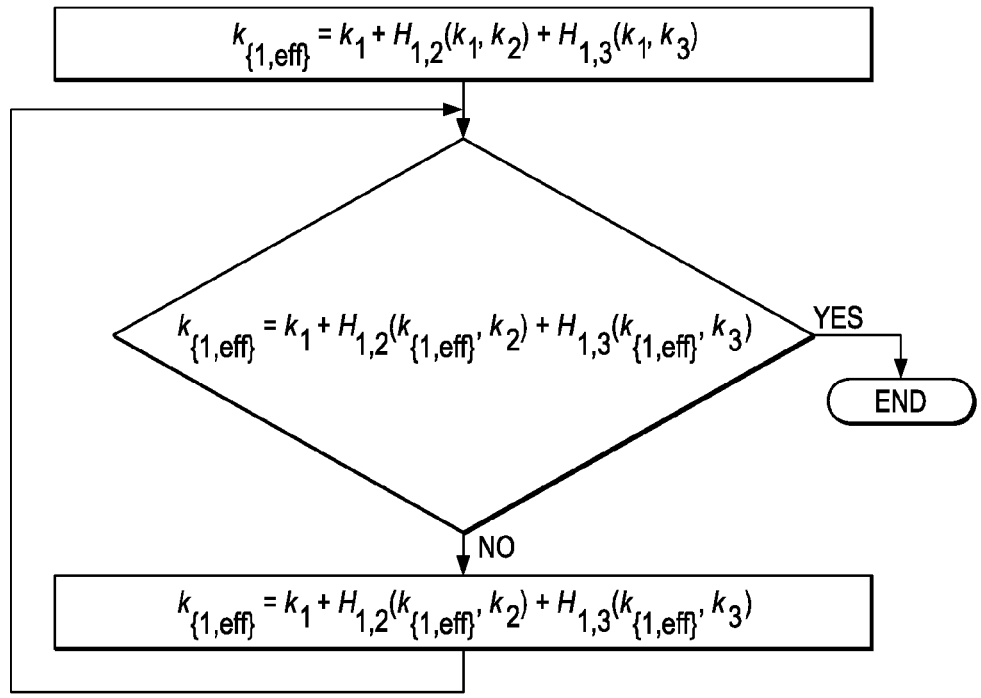
FIG. 7 illustrates a flowchart demonstrating the effective load of a relay terminal.

Assume that each RT has a load of k=2 WTs. The total number of hits for this setup is equal to 1 and is due to the hit occurring at RB 4. However in a practical assignment, once a hit is detected, the RT that was first to assign RB 4 retains it while the other assigns the following RB in its assignment sequence. In this example, assuming that RT 1 was the second in assigning RB 4, it relinquishes RB 4 and assigns RB 7 to its second WT. In this case, another hit will occur at RB 7 and the actual total number of hits for the setup becomes 2. Subsequently, the effective loads of RTs 1 and 2 become, $k_{\{1,\mathit{eff}\}}=2$, and $k_{\{2,\mathit{eff}\}}=3$, respectively. Fortunately, these effective loads can be evaluated using the pairwise hit matrices of (5). In particular, consider a setup of 3 RTs and that RTs 2 and 3 utilize reversed ordered sequences, i.e., sequences generated by a group generator pair, whereas RT 1 uses a sequence generated by a group generator from a different pair. If RTs 2 and 3 were first to assign their RBs before RT 1, then $k_{\{2,\mathit{eff}\}}=k_2$, $k_{\{3,\mathit{eff}\}}=k_3$, and $k_{\{1,\mathit{eff}\}}$ can be iteratively evaluated as follows FIG. 7 illustrates a flowchart of an effective load of an RT. It is now shown how the $\{H_{i,j}\}$ matrices and the effective loads of RTs can be used to evaluate the total pairwise number of hits over all possible load combinations of a fully loaded system. To do this, consider a fully loaded system; i.e., a system loaded with N WTs. Let the group generator being examined and its associated cyclic shift be denoted by $(g_i,s_i)$, and let the corresponding load matrix be denoted by $X_i$. Similarly, let the group generator pair in S and its associated cyclic shifts be denoted by $(g_j,g_j^{-1},s_1,s_j^{-1})$ and let the corresponding load matrices be denoted by $X_1$ and $\overline{X}_j$. In this notation, $\overline{X}_j$ is used to denote the load matrix corresponding to $(g_j^{-1},s_j^{-1})$ Utilizing these load matrices, the total number of pairwise hits over all possible load combinations between the sequences of $(g_i,s_i)$ and $(g_j,g_j^{-1},s_j,s_j^{-1}) \in S$ can be expressed as $$V_{i,j} = \sum_{(k_1,k_2,k_3) \in Y} H_{i,j}(k_{\{1,\mathit{eff}\}}, k_2) + \overline{H}_{i,j}(k_{\{1,\mathit{eff}\}}, k_3), \quad (6)$$

where $k_m$ is the load of RT m, $k_{\{1,\mathit{eff}\}}$ is the effective load of RT 1 and is evaluated using the technique presented in FIG. 7, $Y @ \{(k_1,k_2,k_3)|\Sigma_{m=1}^{3} k_m=N, k_m \in N\}$, $H_{i,j}$ is defined in (5) and $\overline{H}_{i,j} @ X_i^T \overline{X}_j$. Using (6), the total number of pairwise hits between the sequence generated by $(g_i,s_i)$ and the ones generated by each of the group generator pairs and the cyclic shifts in S can be expressed as $$I_i = \sum_{(g_j,g_j^{-1},s_j,s_j^{-1}) \in S} V_{i,j}. \quad (7)$$

Figure 8:
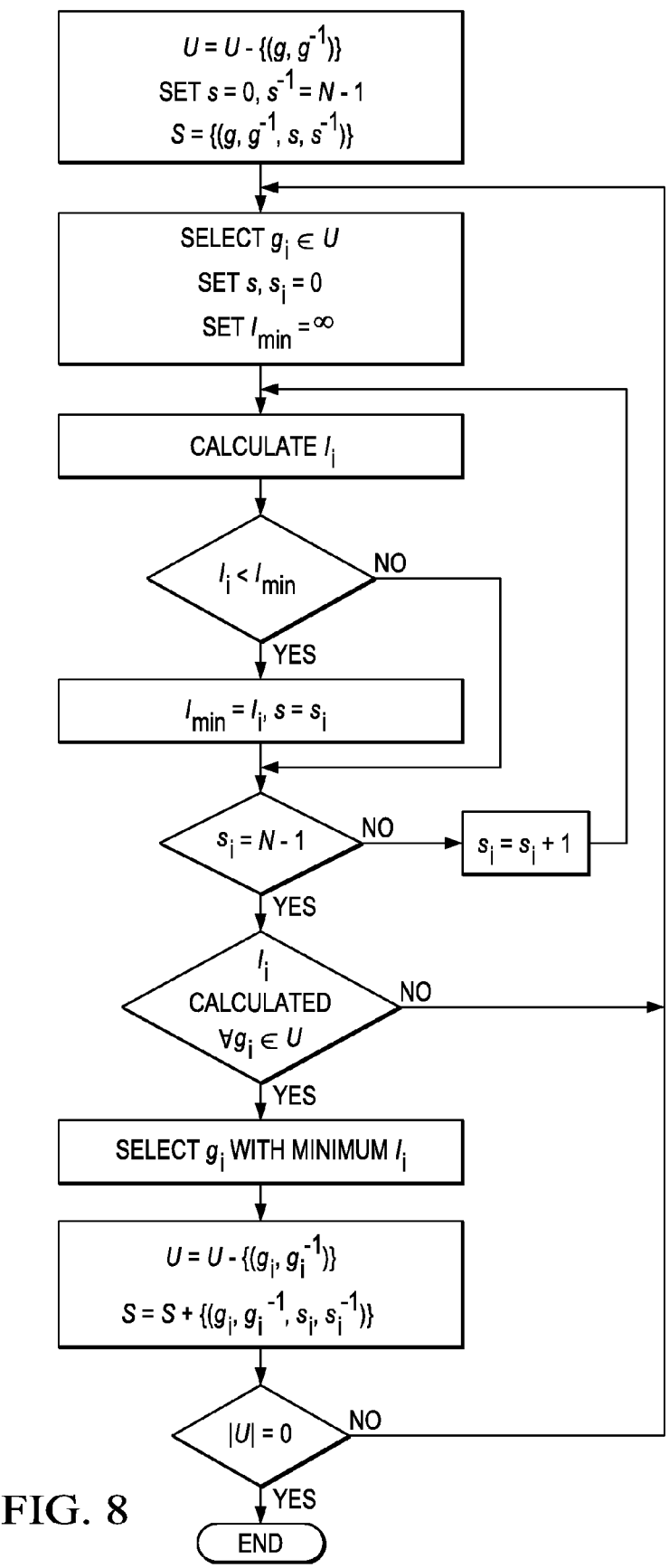
FIG. 8 illustrates a flowchart of an embodiment greedy algorithm for selecting resource block assignment sequences.

After evaluating $\{I_i\}$, the algorithm basis, S, is augmented by the group generator pair and the associated cyclic shifts that yield the minimum total number of pairwise hits $I_i$. The algorithm continues to iterate until S contains all the $$\frac{\phi(N)}{2}$$

group generator pairs and $|U|=0$. The selected group generator pairs and their cyclic shifts are then tabulated in a look-up table according to the order with which they were included in S. Note that that order depends solely on the number of pairwise hits, but not on the number of RTs in the system. This implies that it suffices for the greedy algorithm to be run one time only to obtain a look-up table of cyclically-generated sequences for systems with less than $\phi(N)$ RTs. Thus, in contrast with the exhaustive search scheme, when a WT switches to the relaying mode, the currently active RTs do not need to update their assignment sequences. FIG. 8 illustrates a flowchart of a technique for performing a greedy algorithm.

Computational complexity of the greedy algorithm: To assess the computational complexity of the greedy algorithm, note that only addition operations contribute to the computational cost of evaluating $V_{i,j}$ in (6) and $I_i$ in (7). The number of additions required to evaluate each of the pairwise hit matrices $H_{i,j}$ in (6) is bounded by $N^3$, and, since each iteration of the greedy algorithm considers a setup with 3 RTs, it follows that the cardinality of Y is equal to the number of ways the 100% load (i.e. K=N WTs) can be partitioned into 3 ordered parts, where K is the total load of the 3 RTs. This number is given by $$\binom{N-1}{2}.$$

Hence, the number of addition operations required for computing the pairwise number of hits between the selected group generator i and each of the group generator pairs in S over all possible cyclic shifts $s \in \{0, \ldots, N-1\}$ can be bounded by $$2N^4 + 2N\binom{N-1}{2} = 2N^4 + N^3 - 3N^2 + 2N = O(N^4). \quad (8)$$

Since the number of group generator pairs is given by $$\frac{\phi(N)}{2},$$

in each of the $$\frac{\phi(N)}{2} - 1$$

iterations, the number of group generator pairs in each of the two sets, U and S, can be bounded by $$\frac{\phi(N)}{2} - 1.$$

Consequently, the number of addition operations required for obtaining the cyclic sequences by the greedy algorithm can be bounded by $$(2N^4 + N^3 - 3N^2 + 2N)\left(\frac{\phi(N)}{2} - 1\right)^3. \quad (9)$$

From (9), it can be seen that the computational complexity of the proposed greedy algorithm is polynomial in N. In particular, since $\phi(N)<N$, the computational complexity of the greedy algorithm is bounded by $O(N^7)$. This is in contrast with the complexity of the exhaustive search, which was bounded by $$\frac{1}{2}M(M-1)N^M \left( N^2(N-1) + \binom{N-1}{M-1} \right).  \quad (10)$$

Comparing (9) and (10), it can be seen that the computational complexity of exhaustive search is exponential in the number of RTs, M, whereas the complexity of the greedy algorithm is independent of M.

The graphical metric: Aspects of this disclosure provide an efficient greedy algorithm that yields RB assignment sequences with significantly lower computational complexity when compared to that of exhaustive search. In particular, in each iteration, the algorithm sequentially selects a pair of group generators and its associated cyclic shifts that minimize the total number of pairwise hits of (7). However, a careful inspection of the assignment sequences reveals that the RBs located at the beginning of each sequence, referred to as the effective RBs, are the most significant contributors to the number of hit occurrences incurred by the system. This is because, even in scenarios where the system is lightly loaded, these RBs will still be assigned by the RTs to their incoming WTs. Hence, to reduce the number of hit occurrences, the cyclically-generated sequences should be selected such that the effective RBs of each sequence are unique. To achieve this goal, aspects of this disclosure propose an approximate metric for the greedy algorithm that utilizes the graphical representation of cyclic groups in the sequential selection of the RB assignment sequences. In particular, after pairing the group generators, the cyclically generated sequences of each pair are used to generate a unique pattern that connects all the group elements. Subsequently, the set of effective RBs in the pattern generated by each pair is marked; i.e., the elements at the beginning of the cyclically generated sequences by each pair $(g, g^{-1}, s, s^{-1})$. Following the same steps of the greedy algorithm discussed hereinabove, let S be the set containing the already selected algorithm basis and U be the set containing the group generator pairs that have yet to be selected. At first, S is empty and U contains the $$\frac{\phi(N)}{2}$$

group generator pairs. In the first iteration, the greedy algorithm arbitrarily selects a pair of group generators $(g, g^{-1})$ from U and a cyclic shift s=0 and moves $(g, g^{-1}, s, s^{-1})$ to S. In each of the subsequent $$\frac{\phi(N)}{2} - 1$$

iterations, the algorithm examines each of the remaining group generator pairs, i.e., the ones not already in S, for all possible cyclic shifts $s \in \{0, \ldots, N-1\}$. In particular, it generates a unique pattern for each of the group generator pairs and evaluates the number of incurred hits between the effective RBs of each of these patterns and the ones generated by the pairs in S. The set S is then augmented by the group generator pair and the cyclic shifts that correspond to the pattern yielding the minimum number of hit occurrences.

The graphical representation of cyclic groups: From graph theory, the graphical representation of a cyclic group is a circle that connects all the elements of the group wherein the elements of the group are located on the circumference of the circle. This circle can be constructed from the sequences generated by any pair of group generators; i.e., a group generator and its inverse. Each of the remaining sequences, the ones generated by the remaining pairs of group generators, will contribute to the cyclic graph by a unique pattern that connects all the elements of the group as illustrated in FIG. 9.

Figure 9:
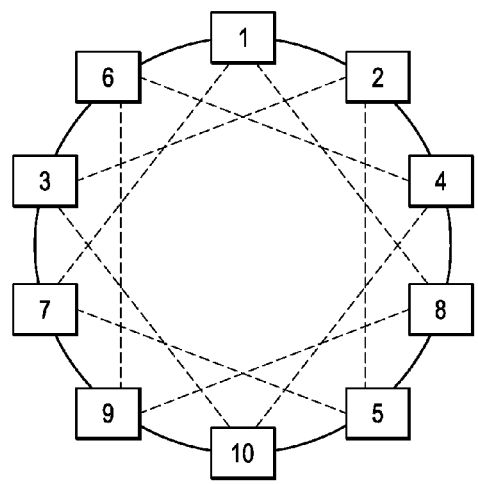
FIG. 9 illustrates a diagram of an embodiment graphical representation of a cyclic group.

FIG. 9 illustrates a graphical representation of the MCG of order 10. This cyclic group has 2 pairs of group generators. One pair is represented by the circle while the other is represented by the inner pattern.

Each of these patterns can be rotated, either clockwise or anti-clockwise, by applying a cyclic shift on its corresponding cyclically-generated sequence. Note that this graphical representation of cyclic groups is unique and depends solely on the order of the cyclic group. In other words, it does not depend on the group generator pair that is chosen to construct the circle. By utilizing this graphical representation, the proposed graphical greedy algorithm sequentially selects the patterns such that the number of hits between their effective RBs is minimized. The details of the greedy sequential selection is described.

The graphical sequences selection metric: After pairing the group generators and cyclic shifts, in the first iteration, a pair is arbitrarily selected and added to the set of algorithm bases S. Using its cyclically-generated sequences, the graphical representation of the cyclic group is constructed; i.e., the circle that connects all the RBs. The effective RBs in these two cyclically-generated sequences are marked. Note that the contribution of an RB to the average number of hit occurrences decreases with its location in the sequence. In particular, the first RB in the sequence will have the highest contribution to the average number of hit occurrences whereas the last RB will have the least contribution. Hence, when graphically evaluating the sequences, only the first $A_i$ RBs in a sequence i will be considered. The set $A_i$ will be referred to as the set of effective RBs. In each of the subsequent $$\frac{\phi(N)}{2} - 1$$

iterations, the algorithm arbitrarily selects a group generator pair in U, constructs its pattern and marks its effective RBs. This pattern is then rotated by a cyclic shift such that the number of hits between its effective RBs and the ones of the patterns constructed by the pairs in S is minimized. The same procedure is repeated for all the patterns generated by the pairs in U. After evaluating the number of hits incurred by each pattern in U, the algorithm basis, S, is augmented by the group generator pair and the associated cyclic shifts that correspond to the pattern that yields the minimum number of hit occurrences between the effective RBs. The algorithm continues to iterate until $$|S| = \frac{\phi(N)}{2}.$$

The selected group generator pairs and their cyclic shifts are then tabulated in a look-up table according to the order with which they were included in S. As an illustrative example of the graphical metric, consider the MCG $G_{10}$ and assume $A_i=2$ for all i. This cyclic group has two pairs of group generators and its cyclically generated sequences are presented in the following table:

| | | | | | | | | | | |
|---|---|---|---|---|---|---|---|---|---|---|
| ($g_1 = 2, s_1 = 0$) | 2 | 4 | 8 | 5 | 10 | 9 | 7 | 3 | 6 | 1 |
| ($g^{-1} = 6, s_1^{-1} = 9$) | 1 | 6 | 3 | 7 | 9 | 10 | 5 | 8 | 4 | 2 |
| ($g_2 = 8, s_2 = 0$) | 8 | 9 | 6 | 4 | 10 | 3 | 2 | 5 | 7 | 1 |
| ($g_2 = 7, s_2^{-1} = 9$) | 1 | 7 | 5 | 2 | 3 | 10 | 4 | 6 | 9 | 8 |

Figure 10:
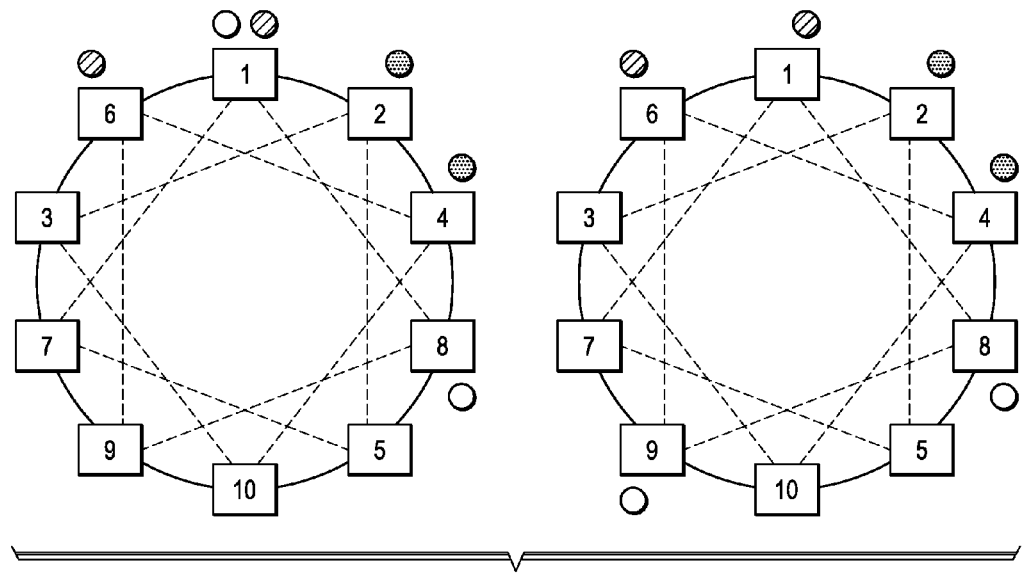
FIG. 10 illustrates a diagram of another embodiment graphical representation of a cyclic group.

The corresponding patterns of these two pairs with their effective RBs marked are depicted in FIG. 9. Since there exists a collision between the effective RBs of the patterns, the inner pattern is rotated clock wise by a cyclic shift s=1. The resulting patterns are depicted in FIG. 10. After the rotation, no hits are incurred between the effective RBs of both patterns.

FIG. 10 illustrates pseudo code for the graphical greedy algorithm. Effect of changing the initial bases on the graphical metric: As noted hereinabove, after pairing the group generators, in the first iteration, the greedy algorithm augments the set S by an arbitrary pair from U. Although choosing a different pair to be the initial basis will change the order in which the pairs are added to S, it will not have an effect on the number of hits incurred between the effective RBs of the selected sequences. To show this, note that the graphical representation of a cyclic group is unique and depends only on the group order. Thus, even if a different initial bases is chosen, the remaining pairs in U will still generate the same unique patterns. Since the graphical greedy metric depends solely on the number of collisions incurred between the effective RBs in the patterns, the order in which the patterns are selected will not change. Subsequently, the total number of hits incurred by the selected group generator pairs will not be changed. Thus, changing the initial bases will have no effect on the graphical metric.

Computational complexity of the graphical greedy algorithm: To assess the computational complexity associated with the proposed graphical greedy algorithm, note that only addition operations contribute to the computational cost of evaluating the number of hits incurred between the effective RBs of each pair. In particular, for a system with N RBs, the number of addition operations required for evaluating the number of hits between the effective RBs of the sequences generated by two pairs can be bounded by 2N. Since each sequence is evaluated over all possible cyclic shifts, s∈1, ..., N, the associated complexity with the evaluation of each of the cyclically-generated sequences over all possible cyclic shifts can be bounded by $2N^2$. Since the number of group generator pairs is given by $$\frac{\phi(N)}{2},$$

in each of the $$\frac{\phi(N)}{2} - 1$$

iterations, the number of group generator pairs in each of the two sets, U and S, can be bounded by $$\frac{\phi(N)}{2} - 1.$$

Consequently the number of addition operations required for obtaining the cyclic sequences by the greedy algorithm can be bounded by $$(2N^2)\left(\frac{\phi(N)}{2} - 1\right)^2 \leq 2N^4. \tag{11}$$

From (9), it can be seen that the computational complexity of the proposed greedy algorithm is polynomial in N and significantly lower than that of the analytical metric and the exhaustive search given by Equations (9) and (10), respectively.

In terminal relaying scenarios, the mobility and large number of RTs impose a significant overhead in acquiring CQIs. Consequently, the cellular network user capacity is reduced. On the other hand, blind resources assignment requires a computationally prohibitive process of optimizing RB assignment over a large set of assignment sequences. Aspects of this disclosure propose a greedy algorithm that sequentially selects the RB assignment sequences adopted by each RT. Although being suboptimal, the proposed algorithm demonstrated comparable performance to the optimal one found through exhaustive search but with a significant reduction in the computational cost. Furthermore, this disclosure shows through group isomorphism that the optimal assignment sequences obtained by searching over the set of cyclically-generated sequences by the ACG structure are globally optimal over the set of all cyclically-generated sequences of the same order. I don't think we need [98] to [101] as they contain the proof of group isomorphism which is irrelevant to this patent.

Consider two finite cyclic groups $(G_N,*)=\{1, \ldots, N\}$ and $(Z_N,+)=\{0, \ldots, N-1\}$ of order N. Let $g_1$ and $g_2$ be two distinct group generators of the cyclic group $G_N$. Let F be an isomorphism function $\{F: G_N \rightarrow Z_N: F(g_1^k(\text{mod } N+1))=k(\text{mod } N)\}$. However, since all cyclic groups are isomorphic to $Z_N$, cf. Lemma 1, there exists at least one isomorphism function that maps the elements of $G_N$ to those of $Z_N$. From Example 4, there exists two group generators $\{z_1,z_2\} \subseteq Z_N$ where $z_1=F(g_1)$ and $z_2=F(g_2)$. The objective is to show that the cyclically-generated sequences by $g_1$ and $g_2$ are isomorphic to the ones generated by $z_1$ and $z_2$.

For the cyclic group $G_1$, applying (1) to the group generators $g_1$ and $g_2$ yields the cyclically-generated sequences $S_1 = (g_1^1(\text{mod } N+1), g_1^2 (\text{mod } N+1), \ldots, g_1^N (\text{mod } N+1))$, (12) $S_2 = (g_2^1(\text{mod } N+1), g_2^2(\text{mod } N+1), \ldots, g_2^N (\text{mod } N+1))$. (13) Applying the isomorphism F to the elements of (12) yields $S_1 = (1, 2, \ldots, 0)$. (14) Given that the sequence generated by any of the group generators of $G_N$ spans the complete sequence of integers from 1 to N, then there exists an integer $1 \leq q \leq N$ such that $g_2 = g_1^q(\text{mod } N+1)$. Since $(g_1^q(\text{mod } N+1))^m (\text{mod } N+1) = g_1^{mq} (\text{mod } N+1) \forall m \in \{1, \ldots, N\}$, substituting $g_2 = g_1^q(\text{mod } N+1)$ in (13) yields: $S_2 = (g_1^q(\text{mod } N+1), g_1^{2q}(\text{mod } N+1), \ldots, g_1^{Nq}(\text{mod } N+1))$. (15) Similar to (14), applying the isomorphism function F to (15) yields: $S_2 = (q(\text{mod } N), 2q(\text{mod } N), \ldots, Nq(\text{mod } N))$. (16) Applying F to $g_1$ and $g_2$ yields the corresponding group generators $z_1$ and $z_2$ in $Z_N$, i.e., $z_1 = F(g_1(\text{mod } N+1)) = 1$, (17); $z_2 = F(g_2 (\text{mod } N+1)) = F(g_1^q(\text{mod } N+1)) = q(\text{mod } N)$. (18) For the additive cyclic group $Z_N$ applying (2) to the group generators $z_1$ and $z_2$ yields the cyclic sequences $S_3$ and $S_4$ $S_3 = (z_1(\text{mod } N), 2z_1 (\text{mod } N), \ldots, Nz_1(\text{mod } N))$, (19); $S_4 = (z_2(\text{mod } N), 2z_2(\text{mod } N), \ldots, Nz_2(\text{mod } N))$. (20). Substituting (17) and (18) in (19) and (20) yields $S_3 = (1, 2, \ldots, 0)$. (21); $S_4 = (q(\text{mod } N), 2q(\text{mod } N), \ldots, Nq(\text{mod } N))$. (22). From (12), (13), (21), and (22), it can be seen that the sequences, $S_1$ and $S_2$, generated by the cyclic group $G_N$ are isomorphic to the sequences, $S_3$ and $S_4$, generated by the additive cyclic group $Z_N$.

With respect to dynamic resources assignment in cellular networks with CQIs, dynamic fractional frequency reuse is proposed in which the set of resources allocated for each sector is updated to reduce interference based on the feedback obtained from the user [11].

With respect to dynamic resources assignment in cellular networks without CQIs, a random assignment of resources is proposed in the absence of CQIs and centralized coordination [4].

With respect to dynamic resources assignment in cellular networks with self-organizing relaying terminals, an autonomous RB assignment scheme for relay-assisted cellular networks based on cyclically-generated sequences by the multiplicative cyclic group structure is proposed. No coordination is assumed between the relaying terminals (RTs), and CQIs are assumed not available either at the base station or at the RTs [5].

The first two categories above do not address the same problem. In particular, these schemes were designed for unassisted-cellular networks. However, they may be extensible to relay-assisted cellular networks by considering each relay as a cell. Furthermore, the second category above considers unstructured random assignment sequences.

With respect to RB assignment in cellular networks with self-organizing relaying terminals, inactive wireless terminals act as RTs to relay the signal of other users to the base station. There is no coordination between RTs. CQIs are assumed not available either at the BS or at the RTs. RTs assign resources to their incoming WTs according to an assignment sequence. Due to the absence of CQIs, interference is measured in terms of hit occurrences. A hit is an event in which an RB is assigned to multiple wireless terminals concurrently.

For a system with NRBs, there exist N! sequences, which is a significantly large number for large values of N. Only a subset of these sequences can be generated from a sequence generator. This subset of sequences is referred to as the cyclically-generated sequences. Each of these N elements sequences is generated by a group generator of the cyclic group which has N elements.

Each cyclically-generated sequence spans all the available RBs in the system. This allows each relay to have access to all the available RBs and enables the network to accommodate non-uniform user distributions. The choice of cyclically-generated assignment sequences has a significant effect on the number of hits, and subsequently interference, in the system.

An embodiment provides an efficient greedy-based autonomous resource block assignment scheme for cellular networks with self-organizing relaying terminals. An embodiment RB assignment scheme performs one or more of the following. It eliminates the need for centralized coordination by the BS. It allows each relaying terminal to have access to all RBs. It utilizes assignment sequences that can be easily generated from a single sequence generator. It does not require the presence of the CQIs neither at the BS nor at the RTs. It selects a set of assignment sequences that is independent from the number of RTs. In particular, when new RTs enter the system it should not affect the sequences utilized by its neighboring RTs. It efficiently selects assignment sequences that reduce the likelihood of hit occurrences. Note that if all RBs are assigned then a hit cannot be avoided. It has a linear computational complexity (unlike exhaustive search, which has an exponential complexity), so it can be applied in systems with a large number of RBs. Points [110-113] are already covered in [65-73], I believe they should be removed to avoid repetition.

An embodiment provides a greedy algorithm for selecting the cyclically-generated RB assignment sequences to be utilized by the relaying terminals. The algorithm sequentially selects the cyclically-generated RB assignment sequences. The selection process is performed once offline prior to system start-up. The algorithm is based on the graphical representation of cyclic groups. The computational complexity of the algorithm is significantly lower than that of exhaustive search. Hence it is applicable in practical systems with large numbers of RTs and WTs. The selected cyclically-generated sequences do not depend on the number of active RTs in the system.

In the greedy-based cyclic assignment algorithm, a metric is the average number of hits over all possible load combinations for all percentages of system loads (0%-100%). This allows the scheme to accommodate non-uniform distributions of users. The RBs located at the beginning of each sequence are the most significant contributors to the average number of hit occurrences. A main objective is to sequentially separate the RBs resulting in the largest number of hit occurrences.

The following discussion provides a simple illustrative example in which there are N=10 RBs in the system and the most effective elements, the ones with the largest contribution to the average number of hits, are chosen to be the first two elements in each sequence.

In an example greedy-based cyclic assignment algorithm, group generators are divided into pairs. One pair is arbitrarily selected and is added to the empty set of algorithm bases, S. The cyclic graph is constructed as a circle that connects all the elements of the sequence generated by one of the group generators of the pair. Elements 1 and 6, and elements 2 and 4, refer to the first two elements in the sequences generated by the two group generators, respectively.

Another pair is arbitrarily selected and the pattern generated by one of its group generators is constructed. The total collisions (common nodes on the graph) between the first two elements in the sequence generated by the selected group generator pair and the ones generated by the pairs in the set S are evaluated. Elements 8 and 9 refer to the first two elements in the sequence generated by one of the group generators of the selected pair.

The inner pattern is rotated by a cyclic shift and the total number of collisions for the setup is evaluated. The same procedure is repeated for all cyclic shifts. The minimum number of collisions along with its cyclic shift are associated with the selected pair. Consequently, another pair is arbitrarily selected and its performance, in terms of number of collisions, is evaluated over all possible cyclic shifts. The inner pattern is rotated by a cyclic shift.

After evaluating the performance of all the available group generator pairs, the one resulting in the minimum number of collisions is moved to the set of selected group generator pairs, S. The following iteration starts with the updated set S and in each iteration one group generator pair is added to S. The same procedure is repeated until the exhaustion of all group generator pairs. The set S is then utilized by the relaying terminals as a look-up table for selecting the cyclically-generated sequences. Relaying terminals select the cyclically-generated sequences that are not utilized by other RTs in the same order with which they were stored in the set S.

The following is pseudo code of the algorithm:

```
Move one group generator pair with a cyclic shift of 0 to the set of
algorithm bases, S.
For each iteration
    For all pairs not in S
        For all possible cyclic shifts
            Generate the cyclic assignment sequence by utilizing the
current cyclic shift and one of the group generators in the selected pair.
            Evaluate the number of collisions between the first
predetermined number of elements in the generated sequence and the ones
generated by the group generators and cyclic shifts stored in S.
        End
        Associate the minimum number of collisions and its
corresponding cyclic shift with the group generator pair.
    End
Move the pair resulting in the minimum number of hits to the set of
algorithm bases, S.
End.
```

An embodiment greedy-based selection of RB assignment sequences sequentially selects the cyclically-generated RB assignment sequences. The computational complexity of the algorithm is linear, unlike the exponential complexity of the exhaustive search. Hence it is applicable in systems with practical number of RBs and WTs. The set of cyclically-generated sequences S does not depend on the number of relaying terminals (RTs) in the system. Hence the algorithm can be performed only once offline prior to system start up. The set of sequences selected by the greedy algorithm is cumulative in the sense that adding additional RTs to the system does not affect the cyclically-generated sequences selected by the current RTs.

An embodiment greedy-based cyclic assignment provides better performance than the random assignment, which does not provide performance guarantees. An embodiment cyclic-greedy assignment does not require the presence of the CQIs. The utilized cyclically-generated sequences do not restrict the number of RBs that can be utilized by any relaying terminal and do not require any coordination between the RTs. An embodiment cyclic-greedy assignment has significantly lower computational complexity than that of exhaustive search. Hence it is applicable for any numbers of RTs and RBs. The set of sequences selected by the greedy algorithm is cumulative and does not require the active RTs to update their sequences when new RTs enter the network.

Figure 12:
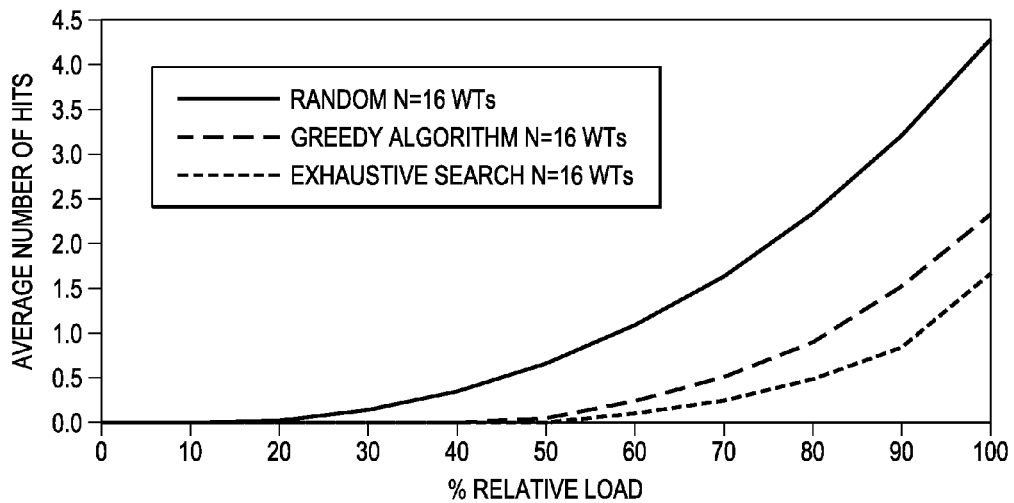
FIG. 12 illustrates a graph of simulation results.
Figure 13:
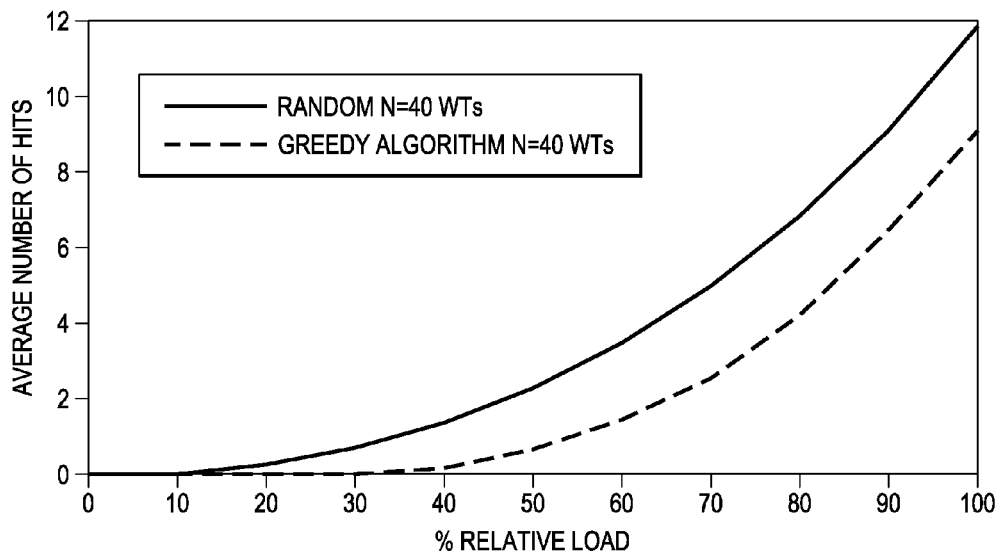
FIG. 13 illustrates a graph of additional simulation results.

FIGS. 12-13 illustrate simulation results, showing the average number of hits over all possible load combinations with the relative load of the system at different system load levels.

An embodiment greedy-based sequences selection scheme is applicable for any number of RTs and WTs. An embodiment scheme does not require the presence of the CQIs and does not require any coordination between the RTs. Hence it reduces the signaling overhead in the network. Simulation results show that an embodiment greedy-based scheme provides comparable performance to that obtained by exhaustive search but with significantly lower computational complexity. The cumulative set of sequences obtained by the algorithm renders the scheme attractive for practical systems in which the number of RTs is time varying. Embodiments may be implemented in wireless networks and devices, such as machine-to-machine communication systems, terminal relays, and the like.

The attached document entitled "An Efficient Greedy-Based Autonomous Resource Block Assignment Scheme for Cellular Networks with Self-Organizing Relaying Terminals," by Y. Fouad, R. Gohary, and H. Yanikomeroglu, which is filed herewith and hereby incorporated herein by reference, provides further description of various embodiments.

Figure 14:
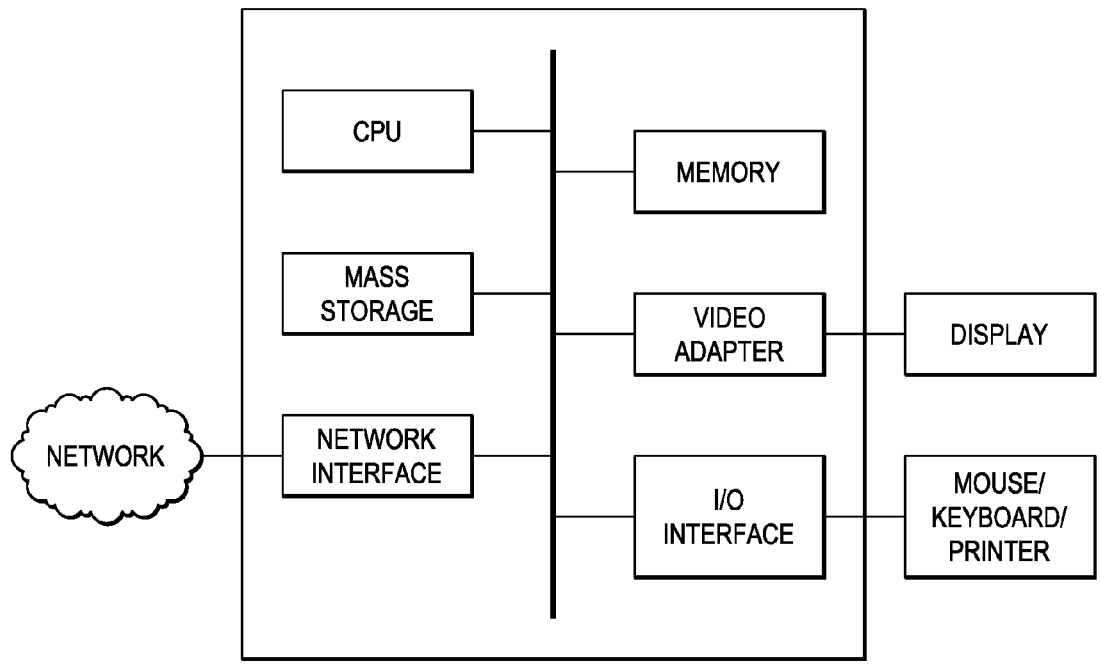
FIG. 14 illustrates a diagram of an embodiment computing platform.

FIG. 14 is a block diagram of a processing system that may be used for implementing the devices and methods disclosed herein. Specific devices may utilize all of the components shown, or only a subset of the components, and levels of integration may vary from device to device. Furthermore, a device may contain multiple instances of a component, such as multiple processing units, processors, memories, transmitters, receivers, etc. The processing system may comprise a processing unit equipped with one or more input/output devices, such as a speaker, microphone, mouse, touchscreen, keypad, keyboard, printer, display, and the like. The processing unit may include a central processing unit (CPU), memory, a mass storage device, a video adapter, and an I/O interface connected to a bus.

The bus may be one or more of any type of several bus architectures including a memory bus or memory controller, a peripheral bus, video bus, or the like. The CPU may comprise any type of electronic data processor. The memory may comprise any type of system memory such as static random access memory (SRAM), dynamic random access memory (DRAM), synchronous DRAM (SDRAM), read-only memory (ROM), a combination thereof, or the like. In an embodiment, the memory may include ROM for use at boot-up, and DRAM for program and data storage for use while executing programs.

The mass storage device may comprise any type of storage device configured to store data, programs, and other information and to make the data, programs, and other information accessible via the bus. The mass storage device may comprise, for example, one or more of a solid state drive, hard disk drive, a magnetic disk drive, an optical disk drive, or the like.

The video adapter and the I/O interface provide interfaces to couple external input and output devices to the processing unit. As illustrated, examples of input and output devices include the display coupled to the video adapter and the mouse/keyboard/printer coupled to the I/O interface. Other devices may be coupled to the processing unit, and additional or fewer interface cards may be utilized. For example, a serial interface such as Universal Serial Bus (USB) (not shown) may be used to provide an interface for a printer.

The processing unit also includes one or more network interfaces, which may comprise wired links, such as an Ethernet cable or the like, and/or wireless links to access nodes or different networks. The network interface allows the processing unit to communicate with remote units via the networks. For example, the network interface may provide wireless communication via one or more transmitters/transmit antennas and one or more receivers/receive antennas. In an embodiment, the processing unit is coupled to a local-area network or a wide-area network for data processing and communications with remote devices, such as other processing units, the Internet, remote storage facilities, or the like.

Figure 15:
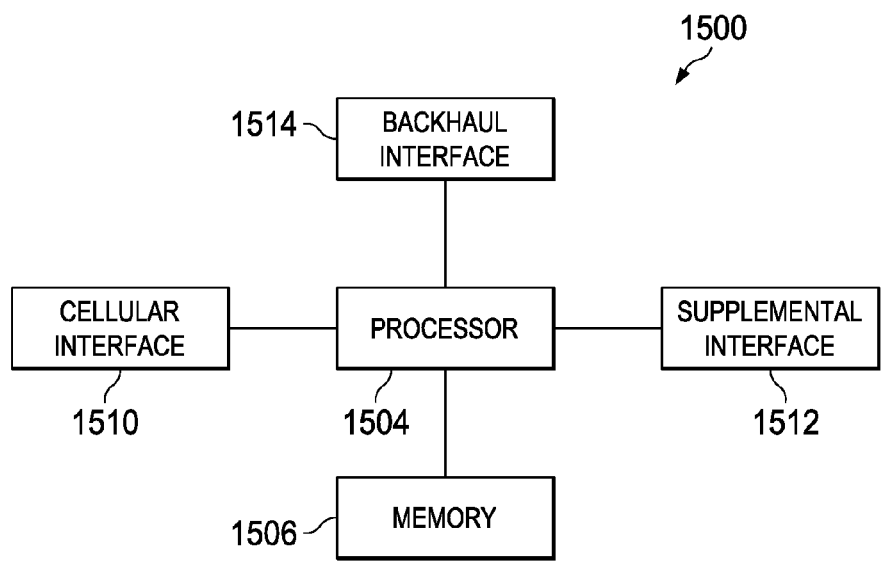
FIG. 15 illustrates a diagram of an embodiment communications device.

FIG. 15 illustrates a block diagram of an embodiment of a communications device 1500, which may be equivalent to one or more devices (e.g., UEs, NBs, etc.) discussed above. The communications device 1500 may include a processor 1504, a memory 1506, a cellular interface 1510, a supplemental interface 1512, and a backhaul interface 1514, which may (or may not) be arranged as shown in FIG. 15. The processor 1504 may be any component capable of performing computations and/or other processing related tasks, and the memory 1506 may be any component capable of storing programming and/or instructions for the processor 1504. The cellular interface 1510 may be any component or collection of components that allows the communications device 1500 to communicate using a cellular signal, and may be used to receive and/or transmit information over a cellular connection of a cellular network. The supplemental interface 1512 may be any component or collection of components that allows the communications device 1500 to communicate data or control information via a supplemental protocol. For instance, the supplemental interface 1512 may be a non-cellular wireless interface for communicating in accordance with a Wireless-Fidelity (Wi-Fi) or Bluetooth protocol. Alternatively, the supplemental interface 1512 may be a wireline interface. The backhaul interface 1514 may be optionally included in the communications device 1500, and may comprise any component or collection of components that allows the communications device 1500 to communicate with another device via a backhaul network.

Although the description has been described in detail, it should be understood that various changes, substitutions and alterations can be made without departing from the spirit and scope of this disclosure as defined by the appended claims. Moreover, the scope of the disclosure is not intended to be limited to the particular embodiments described herein, as one of ordinary skill in the art will readily appreciate from this disclosure that processes, machines, manufacture, compositions of matter, means, methods, or steps, presently existing or later to be developed, may perform substantially the same function or achieve substantially the same result as the corresponding embodiments described herein. Accordingly, the appended claims are intended to include within their scope such processes, machines, manufacture, compositions of matter, means, methods, or steps.

The following references are related to subject matter of the present application. Each of these references is incorporated herein by reference to its entirety:

[1] T. C.-Y. Ng and W. Yu, "Joint optimization of relay strategies and resource allocations in cooperative cellular networks," *IEEE J. Select. Areas Commun.*, vol. 25, pp. 328-339, February 2007.

[2] T. Wang, G. B. Giannakis, and R. Wang, "Smart regenerative relays for link-adaptive cooperative communications," *IEEE Trans. Commun.*, vol. 56, November 2008.

[3] W. Rhee and J. Cioffi, "Increase in capacity of multiuser OFDM system using dynamic subchannel allocation," in *Proc. IEEE Vehic. Tech. Conf (VTC)*, (Tokyo), May 2000.

[4] C. Koutsimanis and G. Fodor, "A dynamic resource allocation scheme for guaranteed bit rate services in OFDMA networks," in *Proc. IEEE Int. Conf. Commun. (ICC)*, (Beijing), 2008.

[5] Y. M. Fouad, R. H. Gohary, and H. Yanikomeroglu, "An autonomous resource block assignment scheme for ofdma-based relay-assisted cellular networks," *IEEE Trans. Wireless Commun.*, vol. 11, pp. 637-647, February 2012.

[6] Z. Kostic and N. Sollenberger, "Performance and implementation of dynamic frequency hopping in limited-bandwidth cellular systems," *IEEE Trans. Wireless Commun.*, vol. 1, pp. 28-36, January 2002.

[7] P. Popovski, H. Yomo, S. Aprili, and R. Prasad, "Frequency rolling: A cooperative frequency hopping for mutually interfering WPANS," in *Proc. ACM In Symp. Mobile Ad Hoc Ntwk. Computing (MOBIHOC)*, (Tokyo), May 2004.

[8] W. W. Adams and L. J. Goldstein, *Introduction to Number Theory*. New Jersey: Prentice-Hall, Inc., 1976.

[9] S. Roman, *Fundamentals of Group Theory: An Advanced Approach*. Boston: Springer, 2011.

[10] J. A. Gallian, *Contemporary Abstract Algebra*. Boston: Houghton Mifflin, 1998.

[11] A. L. Stolyar & H. Viswanathan, Self-Organizing Dynamic Fractional Frequency Reuse in OFDMA Systems., INFOCOM, IEEE, pp. 691-699 (2008).

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method for efficiently generating resource block (RB) assignment sequences for relay terminals, the method comprising:
   obtaining a plurality of patterns for assigning available RBs of a cell;
   selecting both a first pattern from the plurality of patterns and a cyclic shift from a plurality of cyclic shifts to obtain a first pattern, cyclic-shift tuple, wherein remaining patterns in the plurality of patterns are included in a unitary group;
   constructing a cyclic group in accordance with the first pattern, cyclic-shift tuple, wherein the cyclic group is constrained by occupied RBs corresponding to effective RBs of the first pattern, cyclic-shift tuple;
   performing iterative sequential selection of remaining patterns in the unitary group over the plurality of cyclic shifts to obtain an ordering of RB assignment sequences, wherein the first pattern, cyclic-shift tuple specifies a first RB assignment sequence in the ordering of RB assignment sequences; and
   configuring lookup tables in each of the relay terminals in accordance with the ordering of RB assignment sequences.

2. The method of claim 1, wherein constructing the cyclic group in accordance with the first pattern, cyclic-shift tuple comprises constructing a graphical representation of the cyclic group, the graphical representation of the cyclic group positioning the available RBs along the circumference of a circle.

3. The method of claim 1, wherein performing iterative sequential selection of remaining patterns in the unitary group over the plurality of cyclic shifts comprises:
   evaluating each pattern, cyclic shift tuple in accordance with a number of collisions between effective RBs in the pattern, cyclic shift tuple and occupied RBs in the cyclic group.

4. The method of claim 1, wherein performing iterative sequential selection of remaining patterns in the unitary group over the plurality of cyclic shifts to obtain the ordering of RB assignment sequences comprises:
   (i) sequentially evaluating remaining patterns in the unitary group for each of the plurality of cyclic shifts to identify a pattern, cyclic-shift tuple that satisfies a criteria;
   (ii) adding an RB assignment sequence corresponding to the identified pattern, cyclic-shift tuple as a next RB assignment sequence in the ordering of RB assignment sequences;
   (iii) fixing effective RBs of the identified pattern, cyclic-shift tuple as additional occupied RBs of the cyclic group; and
   (iv) removing a pattern corresponding to the identified pattern, cyclic shift tuple from the unitary group.

5. The method of claim 4, further comprising iteratively repeating the steps (i)-(iv) until a threshold number of RB assignment sequences are included in the ordering of RB assignment sequences.

6. The method of claim 4, further comprising iteratively repeating the steps (i)-(iv) until each of the remaining patterns have been removed from the unitary group.

7. The method of claim 4, wherein sequentially evaluating remaining patterns in the unitary group for each of the plurality of cyclic shifts to identify a pattern, cyclic-shift tuple that satisfies the criteria comprises:
sequentially evaluating remaining patterns in the unitary group for each of the plurality of cyclic shifts until a pattern, cyclic-shift tuple produces zero collisions with occupied RBs in the cyclic group; and
identifying the pattern, cyclic-shift tuple producing zero collisions with occupied RBs in the cyclic group.

8. The method of claim 7, wherein sequentially evaluating remaining patterns in the unitary group for each of the plurality of cyclic shifts to identify a pattern, cyclic-shift tuple that satisfies the criteria further comprises:
sequentially evaluating remaining patterns in the unitary group for each of the plurality of cyclic shifts until all patterns in the unitary group have been evaluated when none of the evaluated pattern, cyclic-shift tuples produce zero collisions with occupied RBs in the cyclic group; and
identifying the pattern, cyclic-shift tuple producing the least number of collisions with occupied RBs in the cyclic group.

9. The method of claim 1, wherein constructing the cyclic group in accordance with the first pattern, first cyclic-shift tuple comprises:
constructing the cyclic group in accordance with an ordering of RBs specified by the first pattern;
identifying a first set of effective RBs by applying the selected cyclic shift to the first pattern;
identifying a second set of effective RBs by applying the selected cyclic shift to an arithmetic inverse of the first pattern; and
fixing the effective RBs of the pattern, cyclic-shift tuple as occupied RBs of the cyclic group.

10. The method of claim 1, wherein the lookup tables are structured to provide distributed provisioning of the available RBs and assignment sequences to the relay terminals.

11. The method of claim 1, wherein the relay terminals are wireless terminals configured to autonomously assign the available RBs to mobile devices in accordance with the ordering of RB assignment sequences without collaborating with one another.

12. The method of claim 1, further comprising:
detecting that a number of collisions between effective RBs in evaluated pattern, cyclic-shift tuples and occupied RBs in the cyclic group exceeds a threshold;
increasing a number of available RBs in the cell in response to determining that the number of collisions exceeds the threshold;
deriving an updated ordering of RB assignment sequences in accordance with the increased number of available RBs; and
re-configuring the lookup tables in each of the relay terminals in accordance with the updated ordering of RB assignment sequences.

13. The method of claim 12, wherein increasing a number of available RBs in the cell comprises
repeating at least some frequency assignments over multiple time slots.

14. An apparatus adapted to efficiently generate resource block (RB) assignment sequences for relay terminals, the apparatus comprising:
a processor; and
a computer readable storage medium storing programming for execution by the processor, the programming including instructions to:
obtain a plurality of patterns for assigning available RBs of a cell;
select both a first pattern from the plurality of patterns and a cyclic shift from a plurality of cyclic shifts to obtain a first pattern, cyclic-shift tuple, wherein remaining patterns in the plurality of patterns are included in a unitary group;
construct a cyclic group in accordance with the first pattern, cyclic-shift tuple, wherein the cyclic group is constrained by occupied RBs corresponding to effective RBs of the first pattern, cyclic-shift tuple;
perform iterative sequential selection of remaining patterns in the unitary group over the plurality of cyclic shifts to obtain an ordering of RB assignment sequences, wherein the first pattern, cyclic-shift tuple specifies a first RB assignment sequence in the ordering of RB assignment sequences; and
configure lookup tables in each of the relay terminals in accordance with the ordering of RB assignment sequences.

15. The apparatus of claim 14, wherein the instructions to construct the cyclic group in accordance with the first pattern, cyclic-shift tuple include instructions to construct a graphical representation of the cyclic group, the graphical representation of the cyclic group positioning the available RBs along the circumference of a circle.

16. The apparatus of claim 14, wherein the instructions to perform iterative sequential selection of remaining patterns in the unitary group over the plurality of cyclic shifts includes instructions to:
evaluate each pattern, cyclic shift tuple in accordance with a number of collisions between effective RBs in the pattern, cyclic shift tuple and occupied RBs in the cyclic group.

17. The apparatus of claim 14, wherein the instructions to perform iterative sequential selection of remaining patterns in the unitary group over the plurality of cyclic shifts includes instructions to:
(i) sequentially evaluate remaining patterns in the unitary group for each of the plurality of cyclic shifts to identify a pattern, cyclic-shift tuple that satisfies a criteria;
(ii) add an RB assignment sequence corresponding to the identified pattern, cyclic-shift tuple as a next RB assignment sequence in the ordering of RB assignment sequences;
(iii) fix effective RBs of the identified pattern, cyclic-shift tuple as additional occupied RBs of the cyclic group; and
(iv) remove a pattern corresponding to the identified pattern, cyclic shift tuple from the unitary group.

18. The apparatus of claim 17, wherein the programming further includes instructions to iteratively repeat the steps (i)-(iv) until each of the remaining patterns have been removed from the unitary group.

19. A method for operating a relay terminal, the method comprising:
using a predefined group operation to locally generate a resource block (RB) assignment sequence based on a cyclic group generator and a cyclic shift;
determining that a first number of available RBs is allocated for assignment during a first period; and autonomously assigning, by the relay terminal, RBs to mobile terminals connected to the relay terminal during the first period in accordance with an ordering of RB assignment sequences specified by the RB assignment sequence.

20. The method of claim 19, further comprising:

receiving, by the relay terminal, the cyclic group generator and the cyclic shift from a network device; and receiving, by the relay terminal, data from the mobile terminals over the assigned RBs.

21. A relay terminal adapted to efficiently generate resource block (RB) assignment sequences for relays, the relay terminal comprising:

a processor; and a computer readable storage medium storing programming for execution by the processor, the programming including instructions to:

use a predefined group operation to locally generate a resource block (RB) assignment sequence based on a cyclic group generator and a cyclic shift;

determine that a first number of available RBs is allocated for assignment during a first period; and autonomously assign RBs to mobile terminals connected to the relay terminal during the first period in accordance with an ordering of RB assignment sequences specified by the RB assignment sequence.

22. The relay terminal of claim 21, wherein the programming further includes instructions to:

receive the cyclic group generator and the cyclic shift from a network device; and receive data from the mobile terminals over the assigned RBs.

\* \* \* \* \*